United States Patent
Lee et al.

(10) Patent No.: US 9,005,027 B2
(45) Date of Patent: Apr. 14, 2015

(54) DISTRIBUTED NETWORK ARCHITECTURE FOR INTRODUCING DYNAMIC CONTENT INTO A SYNTHETIC ENVIRONMENT

(75) Inventors: Robert Ernest Lee, Austin, TX (US);
David M. Aldridge, Austin, TX (US);
Bryan Joseph Farina, Foster City, CA (US); Jon Edward Van Caneghem, Menlo Park, CA (US)

(73) Assignee: Trion Worlds, Inc., Redwood City, CA (US)

( * ) Notice: Subject to any disclaimer, the term of this patent is extended or adjusted under 35 U.S.C. 154(b) by 944 days.

(21) Appl. No.: 12/075,108

(22) Filed: Mar. 6, 2008

(65) Prior Publication Data
US 2008/0287192 A1 Nov. 20, 2008

Related U.S. Application Data

(63) Continuation of application No. 11/715,009, filed on Mar. 6, 2007.

(51) Int. Cl.
*A63F 9/24* (2006.01)
*A63F 13/30* (2014.01)
*G06N 3/00* (2006.01)

(52) U.S. Cl.
CPC ............... *G06N 3/006* (2013.01); *A63F 13/12* (2013.01); *A63F 2300/6009* (2013.01)

(58) Field of Classification Search
USPC ........... 463/42, 31, 1; 370/338; 709/220, 203; 455/418
See application file for complete search history.

(56) References Cited

U.S. PATENT DOCUMENTS

| | | | |
|---|---|---|---|
| 5,819,034 A | 10/1998 | Joseph et al. | |
| 5,851,149 A | 12/1998 | Xidos et al. | |
| 5,915,090 A | 6/1999 | Joseph et al. | |
| 5,978,842 A | 11/1999 | Noble et al. | |
| 5,987,466 A | 11/1999 | Greer et al. | |
| 6,015,348 A | 1/2000 | Lambright et al. | |
| 6,052,455 A * | 4/2000 | James | 379/201.03 |
| 6,175,842 B1 | 1/2001 | Kirk et al. | |

(Continued)

FOREIGN PATENT DOCUMENTS

| | | |
|---|---|---|
| EP | 0680185 A2 | 4/1995 |
| JP | 2002049592 | 2/2002 |

(Continued)

OTHER PUBLICATIONS

Copenheaver, Blaine, R.; Notification of Transmittal of the International Search Report and the Written Opinion of the International Searching Authority, or the Declaration; International Application No. PCT/US 08/003055; Date of Mailing Aug. 11, 2008; Form PCT/ISA/220 (1 page); Form PCT/ISA/210 (4 Pages); and Form PCT/ISA/237 (5 pages).

(Continued)

*Primary Examiner* — Masud Ahmed
(74) *Attorney, Agent, or Firm* — Van Pelt, Yi & James LLP

(57) ABSTRACT

Embodiments of the invention relate generally to computer-based simulations and synthetic environment generation, and more particularly, to a system, a computer-readable medium, a method and an apparatus for generating synthetic environments in a distributed architecture to, among other things, introduce dynamic content.

22 Claims, 23 Drawing Sheets

(56) References Cited

U.S. PATENT DOCUMENTS

| | | | |
|---|---|---|---|
| 6,253,367 B1* | 6/2001 | Tran et al. | 717/108 |
| 6,751,212 B1 | 6/2004 | Kaji et al. | |
| 6,757,696 B2 | 6/2004 | Multer et al. | |
| 6,816,787 B2* | 11/2004 | Ramamoorthy et al. | 702/7 |
| 6,883,168 B1 | 4/2005 | James et al. | |
| 6,892,230 B1* | 5/2005 | Gu et al. | 709/220 |
| 6,950,848 B1 | 9/2005 | Yousefi'zadeh | |
| 7,168,035 B1 | 1/2007 | Bell et al. | |
| 7,290,056 B1 | 10/2007 | McLaughlin, Jr. | |
| 7,373,377 B2* | 5/2008 | Altieri | 709/203 |
| 7,471,947 B1* | 12/2008 | Papineau | 455/418 |
| 7,502,843 B2 | 3/2009 | Kirstein et al. | |
| 7,818,077 B2* | 10/2010 | Bailey | 700/94 |
| 8,026,918 B1 | 9/2011 | Murphy | |
| 8,104,042 B2 | 1/2012 | Forrester | |
| 2002/0161908 A1 | 10/2002 | Benitez et al. | |
| 2003/0009558 A1 | 1/2003 | Ben-Yehezkel | |
| 2003/0058238 A1* | 3/2003 | Doak et al. | 345/419 |
| 2003/0108022 A1* | 6/2003 | Yamamoto | 370/338 |
| 2003/0167305 A1 | 9/2003 | Zhu et al. | |
| 2003/0177187 A1 | 9/2003 | Levine et al. | |
| 2004/0076178 A1 | 4/2004 | Botton | |
| 2004/0088412 A1 | 5/2004 | John et al. | |
| 2004/0103141 A1 | 5/2004 | Miller et al. | |
| 2004/0193441 A1* | 9/2004 | Altieri | 705/1 |
| 2004/0243535 A1 | 12/2004 | Bailey | |
| 2005/0068167 A1 | 3/2005 | Boyer et al. | |
| 2005/0091653 A1 | 4/2005 | Willehadson et al. | |
| 2005/0120160 A1 | 6/2005 | Plouffe et al. | |
| 2005/0170893 A1 | 8/2005 | Muir et al. | |
| 2005/0193120 A1 | 9/2005 | Taylor | |
| 2005/0209002 A1 | 9/2005 | Blythe et al. | |
| 2005/0272492 A1* | 12/2005 | Stelly, III | 463/1 |
| 2006/0014585 A1* | 1/2006 | Neogi | 463/42 |
| 2006/0036949 A1 | 2/2006 | Moore et al. | |
| 2006/0135259 A1 | 6/2006 | Nancke-Krogh et al. | |
| 2006/0146848 A1 | 7/2006 | Kirstein et al. | |
| 2006/0274784 A1 | 12/2006 | Hsueh et al. | |
| 2006/0287096 A1 | 12/2006 | O'Kelley et al. | |
| 2007/0117630 A1 | 5/2007 | Fowler et al. | |
| 2007/0130150 A1 | 6/2007 | Fowler et al. | |
| 2007/0173327 A1 | 7/2007 | Kilgore et al. | |
| 2007/0191103 A1 | 8/2007 | Van Luchene | |
| 2007/0218987 A1 | 9/2007 | Van Luchene et al. | |
| 2007/0265091 A1 | 11/2007 | Aguilar et al. | |
| 2008/0009345 A1 | 1/2008 | Bailey et al. | |
| 2008/0026845 A1 | 1/2008 | Aguilar et al. | |
| 2008/0026847 A1 | 1/2008 | Mueller et al. | |
| 2008/0090659 A1 | 4/2008 | Aguilar et al. | |
| 2008/0176655 A1 | 7/2008 | James et al. | |
| 2008/0207327 A1 | 8/2008 | Van Luchene et al. | |
| 2008/0220873 A1 | 9/2008 | Lee et al. | |
| 2008/0294417 A1 | 11/2008 | Brunstetter et al. | |
| 2008/0294782 A1 | 11/2008 | Patterson et al. | |
| 2009/0006566 A1 | 1/2009 | Veeramachaneni et al. | |
| 2009/0017916 A1 | 1/2009 | Blanchard et al. | |
| 2009/0055369 A1 | 2/2009 | Phillips et al. | |
| 2009/0089439 A1 | 4/2009 | Benco et al. | |
| 2009/0111576 A1 | 4/2009 | Ostergren et al. | |
| 2009/0125481 A1 | 5/2009 | Mendes da Costa et al. | |
| 2009/0131177 A1 | 5/2009 | Pearce | |
| 2009/0176557 A1 | 7/2009 | Hall et al. | |
| 2009/0199275 A1 | 8/2009 | Brock et al. | |
| 2009/0209335 A1 | 8/2009 | Pearce | |
| 2009/0215433 A1 | 8/2009 | Cavanaugh et al. | |
| 2009/0231112 A1 | 9/2009 | Baalbergen et al. | |
| 2009/0235176 A1 | 9/2009 | Jayanthi | |
| 2009/0239556 A1 | 9/2009 | Sennett et al. | |
| 2009/0253494 A1 | 10/2009 | Fitch et al. | |
| 2009/0287640 A1 | 11/2009 | Hamilton et al. | |
| 2009/0319668 A1 | 12/2009 | Hamilton et al. | |
| 2009/0325712 A1 | 12/2009 | Rance | |
| 2010/0009703 A1 | 1/2010 | Sornay | |
| 2010/0203936 A1 | 8/2010 | Levy et al. | |
| 2010/0251330 A1 | 9/2010 | Kroeselberg et al. | |
| 2010/0255916 A1 | 10/2010 | Sioufi Filho | |
| 2010/0274914 A1 | 10/2010 | Birch et al. | |
| 2010/0299615 A1 | 11/2010 | Miluzzo et al. | |
| 2011/0041153 A1 | 2/2011 | Simon et al. | |
| 2012/0079046 A1 | 3/2012 | Murphy | |
| 2012/0084364 A1 | 4/2012 | Sivavakeesar | |
| 2013/0133087 A1 | 5/2013 | Proctor et al. | |

FOREIGN PATENT DOCUMENTS

| | | |
|---|---|---|
| JP | 2002539532 | 11/2002 |
| KR | 10-2004-0014411 | 2/2004 |
| RU | 2236702 | 9/2004 |
| WO | 2008109132 | 9/2008 |

OTHER PUBLICATIONS

Copenheaver, Blaine, R.; Notification of Transmittal of the International Search Report and the Written Opinion of the International Searching Authority, or the Declaration; International Application No. PCT/US 08/003000; Date of Mailing Jun. 26, 2008; Form PCT/ISA/220 (1 page); Form PCT/ISA/210 (2 Pages); and Form PCT/ISA/237 (6 pages).

McFarlane; Network Software Architectures for Real-Time Massively-Multiplayer Online Games; McGill University; Feb. 2, 2005.

Engtech, How to Get an RSS Feed for your XBOX 360 Gamertag , Mar. 31, 2008, pp. 1-7.

Duncan Mackenzie, Connect your XBOX 360 Gamertag to Twitter, May 11, 2007, pp. 1-5.

Psychostats, PsychoStats, Oct. 11, 2007, pp. 1-2.

Blizzard, The Armory, Oct. 2, 2007, pp. 1-3.

Kuester et al., Virtual Explorer: A Plugin-Based Virtual Reality Framework, SPIE Proceedings, The International Society for Optical Engineering, vol. 4297, Jan. 22, 2001.

\* cited by examiner

DISTRIBUTED NETWORK ARCHITECTURE FOR INTRODUCING DYNAMIC CONTENT INTO A SYNTHETIC ENVIRONMENT

CROSS REFERENCE TO RELATED APPLICATIONS

This application is a Continuation Application of U.S. Nonprovisional application Ser. No. 11/715,009, filed on Mar. 6, 2007, which is hereby incorporated by reference for all purposes.

BRIEF DESCRIPTION OF THE INVENTION

Embodiments of the invention relate generally to computer-based simulations and synthetic environment generation, and more particularly, to a system, a computer-readable medium, a method and an apparatus for generating synthetic environments in a distributed architecture to, among other things, introduce dynamic content.

BACKGROUND OF THE INVENTION

Traditional techniques for designing and simulating computer-generated environments, such as virtual worlds in massively multiplayer online ("MMO") games, do not readily facilitate the efficient development and production of new or modified virtual worlds. Moreover, conventional game platforms for generating virtual worlds further impede the development and production of virtual worlds, especially with respect to massively multiplayer online games. Generally, conventional game platforms use a set of game servers to create a virtual world, with each additional set of games servers being used to create a copy of the virtual world. Such copies are typically referred to as "shards." Conventional game platforms routinely divide the geography of each virtual world into partitions, and allocate one game server to generate each single partition. A game server that is configured to generate a partition of a virtual world is commonly referred to as an "area server." Further, some conventional game servers are monolithic, which means that all the game processes for generating a partition for a virtual world are instituted in a single process and/or server. While functional, there are a variety of drawbacks associated with conventional game platforms, as well as the traditional approaches to developing computer-generated worlds.

A drawback for some conventional game platforms is that they allocate one game server for a partition of the virtual world. As such, the game server and its functionality are usually linked directly to the partition and its activities. The performance of a geographically-linked game server, therefore, is a function of the number of players at that partition as well as the kinds of activities being performed there. Further, conventional game platforms that use monolithic game servers are somewhat limited by their inability to adjust their hardware capabilities to meet increases in demand. So, as more players move to a specific partition, the game server that supports that partition becomes increasingly burdened. This, in turn, limits the number of players that can interact with the corresponding virtual world partition. As a remedy, some massively multiplayer online games operate to migrate players off game servers that are heavily populated to game servers that are relatively less populated. This may significantly impact player experience.

Yet another drawback to traditional game platforms is that each game server usually has a separate process space for generating a virtual world partition than the other game servers in the same virtual world. It is not uncommon that players interact across a geographic boundary that demarcates two virtual world portions. As such, difficulties arise due to partition boundaries and conventional game platforms generally require computational resources to try to manage cross-partition interactions. For example, a game server associated with one player in one partition generally requires some sort of tracking functionality to track the interactions of that player with other players in other virtual world partitions. As another example, consider that computational resources are generally required to maintain players as proxies in different process spaces. Traditionally, implementing players as proxies requires converting one representation of player-specific information for one virtual world partition, such as a character identifier, into another representation for use with a separate process space for another virtual world partition. Further, game servers usually communicate among themselves about player interactions using, for example, remote procedure calls, which increases the complexity of communications as well as latency for cross-partition interactions.

A further drawback to conventional game platforms is that players (or proxies of players) that interact across different virtual world partitions can readily disrupt transactions to unjustly enrich themselves. To illustrate, consider that a first player at one virtual world partition offers to exchange a weapon for gold possessed by a second player at another virtual world partition. Next, consider that the first player receives the gold, but before surrendering the weapon, the first player breaks the connection between the game servers at the different virtual world partitions. As a result, the first player will receive the gold without exchanging the weapon.

One drawback to using monolithic game servers is that if one of the game subprocesses, such as a physics process, of a monolithic game server falters or shuts down, then the entire game server in which the game subprocess resides is also susceptible to faltering or shutting down.

There are other drawbacks to using current client-server architectures to design and simulate computer-generated environments for massively multiplayer online games. Consider that along with the development activities required to create new content for new or modified virtual worlds, game designers and developers also regularly modify executable instructions to accommodate the new content and its data. Modifying executable instructions usually increases the development time, especially during quality assurance and reliability testing to weed out bugs and other problems. Further, massively multiplayer online games commonly require the modified executable code to be downloaded to a client prior to interacting with the new content. For instance, it is not uncommon for massively multiplayer online game platforms to implement large data downloads (e.g., 250 MB), which can include the modified executable code.

In view of the foregoing, it would be desirable to provide a system, a computer-readable medium, a method and an apparatus for generating synthetic environments in a distributed architecture to, among other things, introduce dynamic content into the synthetic environments, and to further provide for efficient development and production of new or modified synthetic environments.

SUMMARY OF THE INVENTION

Embodiments of the invention relate generally to computer-based simulations and synthetic environment generation, and more particularly, to a system, a computer-readable medium, a method and an apparatus for generating synthetic environments in a distributed architecture to, among other things, introduce dynamic content. In one embodiment, a synthetic environment generation platform can implement a universal data structure and a messaging system to facilitate generation of synthetic environments.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings. Note that most of the reference numerals include one or two left-most digits that generally identify the figure that first introduces that reference number.

DETAILED DESCRIPTION

Figure 1A:
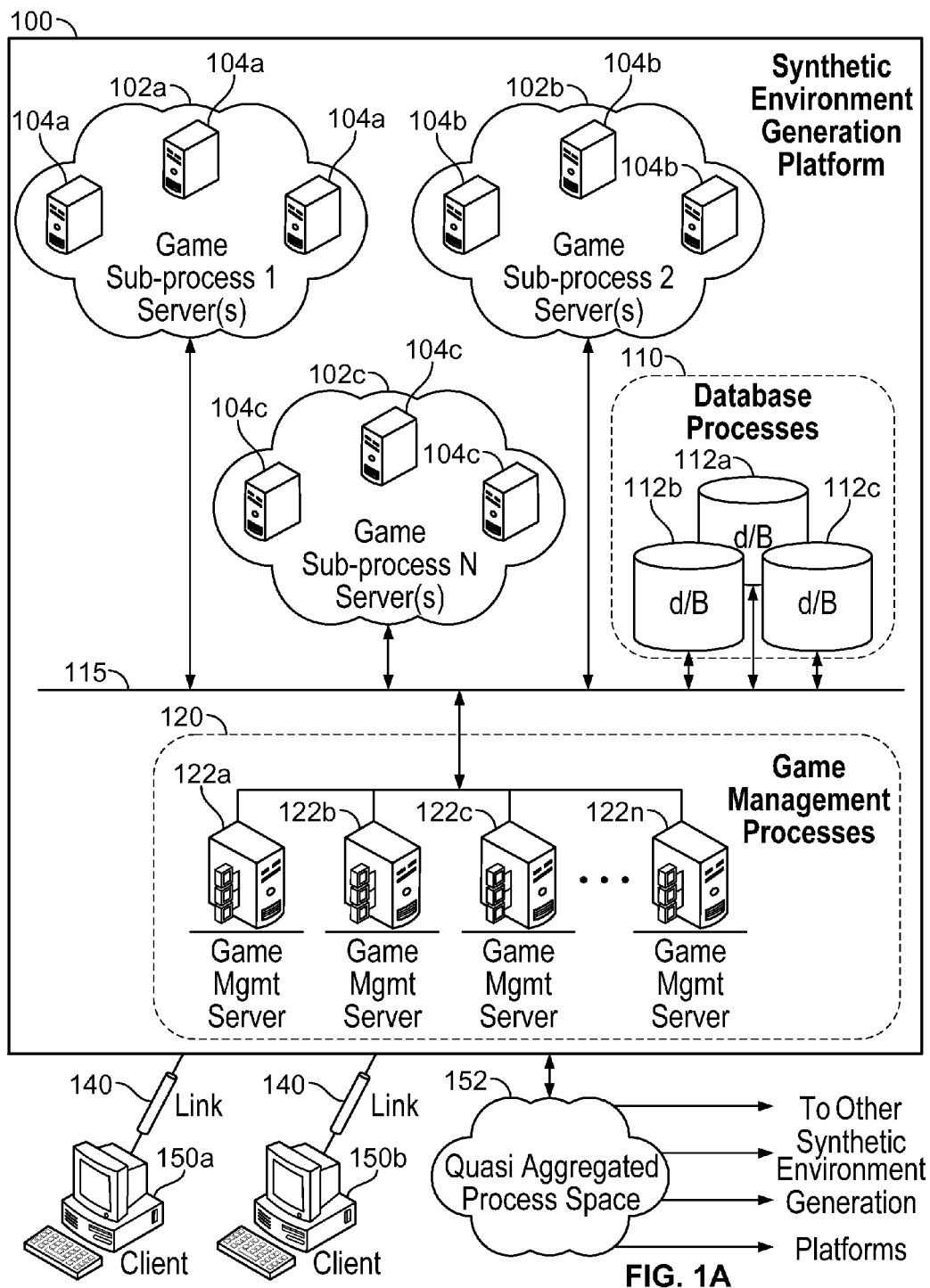
FIG. 1A depicts a system for generating synthetic environments in accordance with at least one embodiment of the invention.

FIG. 1A depicts a system for generating synthetic environments in accordance with at least one embodiment of the invention. One example of such a system is a synthetic environment generation platform 100, which include nodes (and node processes) that are networked together to generate a synthetic environment with which clients 150 interact. Synthetic environment generation platform 100 represents the server-side structure and/or functionality in a client-server network architecture, and clients 150 represent the client-side structure and/or functionality. The nodes include game subprocess servers 104, databases 112 and game management servers 122, all of which are coupled together by a network 115, to respectively implement game subprocesses 102, databases processes 110, and game management processes 120. Game subprocesses 102 can include more or fewer than subprocesses 102a, 102b and 102c. As shown, game subprocess servers 104 are arranged in a distributed arrangement relative to at least game management servers 122, thereby separating game subprocesses 102 from game management processes 120. In at least one embodiment, game subprocess servers 104a, game subprocess servers 104b, and game subprocess servers 104c can be configured to operate as physics servers, artificial intelligence servers, and transaction servers, respectively, or as any other game-related subprocess. Further, synthetic environment generation platform 100 is configured to implement a quasi aggregated process space 152 that can be shared either among game management servers 122, or among synthetic environment generation platform 100 and other similar synthetic environment generation platforms 100 (not shown), or both, according to various embodiments.

By distributing game subprocesses 102a, 102b and 102c separately from game managements processes 120, game management servers 122 operate independently, thereby making them less vulnerable to deteriorations in performance of any of game subprocess servers 104. Thus, hardware and software failures can be localized to a specific game server subprocess 102, thereby enabling expedited problem identification and resolution, often without interrupting the game management processes 120. This allows clients 150, such as client 150a and client 150b, to continue interacting with a synthetic environment without being interrupted by problems occurring with game subprocess servers 104. In addition, distributed game subprocesses 102a, 102b and 102c promote independent scaling in the amount of game subprocess servers 104 that can be brought online to sufficiently provide an appropriate amount of game subprocesses 102a, 102b and 102c. For example, if a synthetic environment requires additional artificial intelligence, then additional artificial intelligence servers can be brought online independent of the needs of other game subprocesses 102, such as physics processes. Thus, an appropriate amount of hardware and software can be implemented to facilitate synthetic environment generation for any number of clients 150 interacting with the synthetic environment generated by synthetic environment generation platform 100. Further, quasi aggregated process space 152, which is shared with other similar synthetic environment generation platforms, facilitates inter-platform (i.e., cross-shard) interactions, thereby providing for improved communications and more secure transactions, among other things.

Game management servers 122 are each configured to collaborate with game subprocesses 102 and databases processes 110 to generate a synthetic environment with which a participant interacts. As such, game management servers 122 are configured to manage a number of participants associated with clients 150 in their interactions with the synthetic environment. Note that game subprocesses 102 can be scaled accordingly to support the number of clients 150. In various embodiments, clients 150 can be distributed across multiple game management servers 122, rather than being restricted to one game-generating process. To illustrate, consider that client 150a can interact with game management server 122a and client 150b can interact with game management server 122c. While clients 150a and 150b interact with different game management processes, they can share a quasi aggregated process space 152, regardless of the synthetic environment with which clients 150a and 150b interact. In one embodiment, clients 150a and 150b can share quasi aggregated process space 152 as a common process space. As such, cross-synthetic environment interactions can readily occur. In some embodiments, game management servers 122 can operate to validate an action requested by a particular participant, thereby authenticating that the participant has rights to modify game data. In at least one embodiment, game management servers 122a to 122n maintain the game data representing interactions by clients 150 with the synthetic environment in a read-only form. As such, the game data cannot be manipulated to corrupt transactions that might otherwise unjustly enrich a participant.

In one embodiment, game subprocess servers 104a can be physics servers, which can be configured to process movement and collision activity, such as for a participant in a synthetic environment. For example, physics server 104a can process physics-related events, such as collision detection, rigid body movement, and the like. Game subprocess servers 104b, according to at least one embodiment, can be artificial intelligence servers, which can be configured to provide artificial intelligence to simulate, for example, movement by non-player characters ("NPC") in a synthetic environment.

In various embodiments, game subprocess server 104c can be a transaction server, which can be configured to manage transactions among participants to ensure the transactions are atomic. That is, game subprocess server 104c can operate to ensure that all parts of a transaction occur, or all do not occur, thereby guaranteeing that game data stored in database processes 110 are not updated unless all parts of the transactions succeed, thereby reducing loop-holes for participants to seek unjust enrichments. The transaction server is the game authority that ensures that an activity is completed correctly for both participants, or is failed by both participants. In one embodiment, all servers in synthetic environment generation platform 100 are read-only except game subprocess server 104c (as a transaction server). Thus, a transaction server—as game subprocess server 104c—can operate as a single authority for transacting game data (i.e., it is authorized to modify game data). In at least one embodiment, a transaction server constituting a game subprocess server 104 can be configured to implement quasi aggregated process space 152 as a unitary process space, thereby enabling participants to engage game management servers for different synthetic environments while transacting within a emulated common process space provided by quasi aggregated process space 152.

In operation, clients 150a and 150b generate requests to cause representations of the participants, such as avatars, to modify game data in game management processes 120. As used herein, the term "game management server," at least in one embodiment, refers to a computing device and/or a process that manages interactions of participants with a synthetic environment. For example, a game management server can accept input from clients 150, and, in response, collaborate with game subprocesses 102 and database processes 110 to generate modified game data, which represents a modified synthetic environment based on client interaction, for transmission back to clients 150a and 150b. As used herein, the term "game subprocess server," at least in one embodiment, refers to a computing device and/or a process that performs a subset of a game process, such as a physics server and an artificial intelligence server, the results of which are used by a game management server.

As used herein, the term "node," at least in one embodiment, refers to computing devices and/or processes that influence the generation of a synthetic environment, such as a server, a client, a database, and the like. As used herein, the term "game data," at least in one embodiment, refers to at least a subset of data relating to the generation of a synthetic environment. Game data can include map data to, for example, generate a terrain of a synthetic environment. Game data can also include the state of a participant, including character data, inventory data (e.g., weapons data), bank data, synthetic home data, award data, and the like. As used herein, the term "synthetic environment," at least in one embodiment, can refer to a virtual world (or a portion thereof) that is a computer-based simulated environment intended for its participants to inhabit and interact via, for example, avatars. A synthetic environment can also refer to a shard or a persistent world (or a portion thereof), which is a virtual world that progresses without or without participant interaction. As used herein, the term "participant," at least in one embodiment, refers to either a player, or a two or three-dimensional graphical representation (e.g., an avatar) representation of the player, or both. A participant can also refer to a client with which the player interacts. As used herein, the term "quasi aggregated process space," at least in one embodiment, refers to a memory space allocated for an application and/or implemented for executing instructions by a processor (e.g., one or more central processing units ("CPUs")), whereby the memory space is configured to behave as an aggregated, common process space for certain types of data, and is further configured to behave as separate process spaces for one or more other types of data.

Note that game subprocess servers 104 and game subprocesses 102 can be configured to implement any other game-related processes to facilitate, for example, massively multi-player online gaming ("MMO") in accordance with other embodiments. Further, one or more databases 112a to 112c can be configured to store data, for example, to generate the synthetic environment, among other things. As such, one or more databases 112a to 112c can store account data relating to participant accounts, statistical data, audit data, game data, and the like. In a specific embodiment, synthetic environment generation platform 100 is configured to exchange data via a link 140, which can convey communications signals through, for example, any of a number of networks (not shown), including the Internet. In one embodiment, link 140 is configured to transmit and/or receive data at least from about 5 Kbs to about 10 Kbs, or higher. As such, link 140 can support 5 Kbs upstream and 5 Kbs downstream, especially at substantially the same time. In other embodiments, link 140 is a relatively high bandwidth link that can be implemented as a broadband connection, such as using digital subscriber line ("DSL") technologies, cable technologies, satellite technologies, and the like. Also, link 140 can be a wireless link. In one embodiment, high bandwidth link 140 can transmit and/or receive data at rates faster than 10 Kbs, and, as such, link 140 can implement data transfer rates higher than 10 Kbs. Further, network 115 is configured to transport messages and/or packets at a rate of at least 1 to 16 gigabits per second, or faster. In one embodiment, network 115 is a 10 gigabit Ethernet ("10 GbE") network.

Figure 1B:
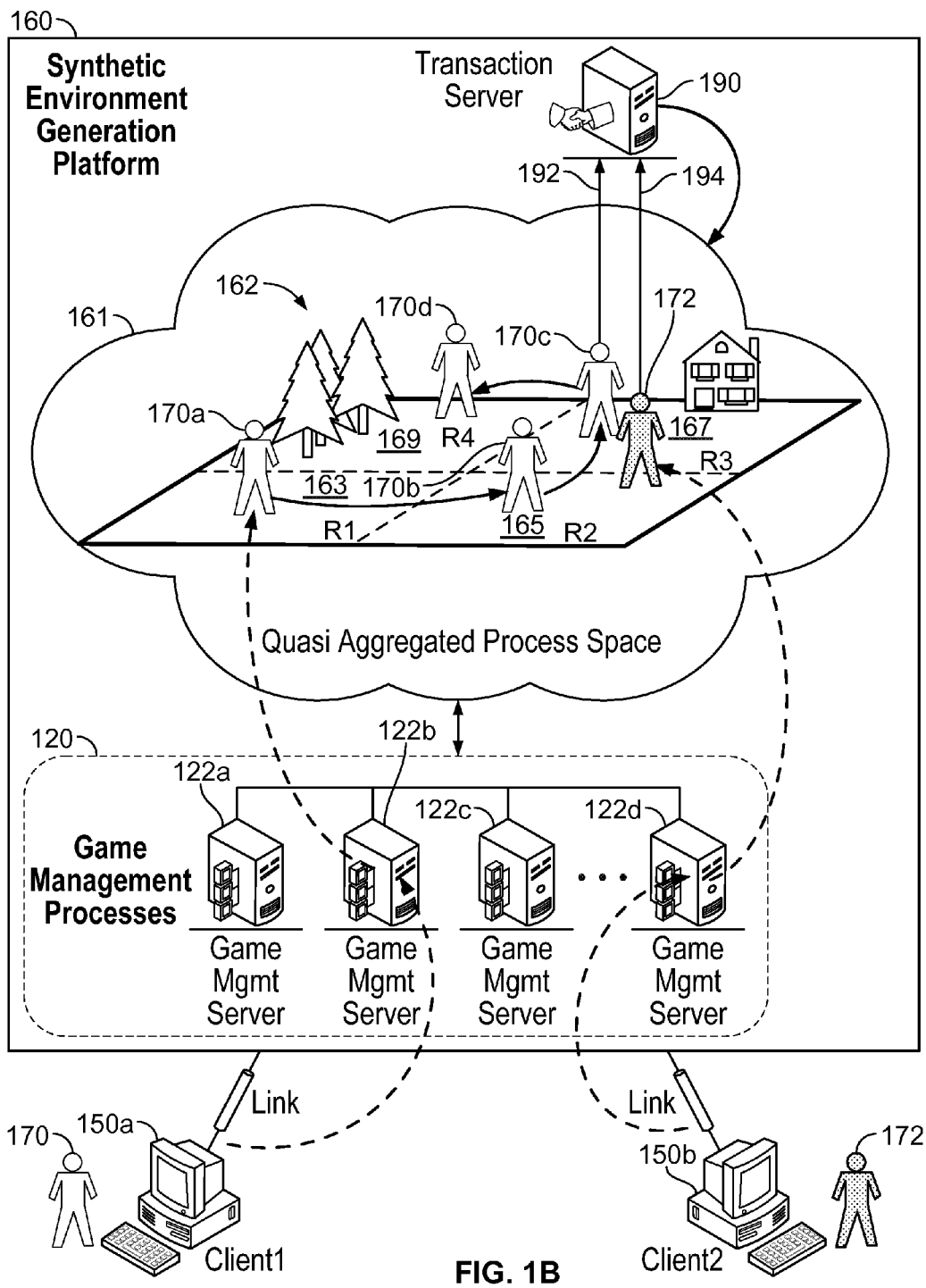
FIG. 1B is an illustration of game management servers generating, in whole or in part, a synthetic environment with respect to a quasi aggregated process space in accordance with at least one embodiment of the invention.

FIG. 1B is an illustration of game management servers generating, in whole or in part, a synthetic environment in connection with a process space, according to at least one embodiment of the invention. Synthetic environment generation platform 160 is configured to generate a synthetic environment 162 for clients 150a and 150b. In this example, synthetic environment 162 includes four regions: region one ("R1") 163, region two ("R2") 165, region three ("R3") 167, and region four ("R4") 169. Next, consider that participant 170 and participant 172 are respectively associated with clients 150a and 150b. Synthetic environment generation platform 160 includes game management processes 120 implemented by game ("mgmt") management servers 122a to 122d. Synthetic environment generation platform 160 also includes a quasi aggregated process space 161 with which synthetic environment 162 can be generated.

According to various embodiments of the invention, quasi aggregated process space 161 is configured to operate as a common process space in some instances and as a collection of separate processes during other instances. In particular, quasi aggregated process space 161 is configured to function as a common process space for a first subset of game data, and is configured to function as separate process spaces for a second subset of data. For example, transaction server 190 is configured to implement quasi aggregated process space 161 as a common process space for non-geometry-related data and transaction-related data, for example, whereas game management servers 122 are configured to implement quasi aggregated process space 161 as separate process spaces for geometry-related data, as an example. In at least one embodiment, synthetic environment generation platform 160 includes a transaction server 190 to implement, in whole or in part, quasi aggregated process space 161. In particular, transaction server 190 has a common process space with which to process both the first subset of data 192 for participant 170c and the first subset of data 194 for participant 172. Examples of the first subsets of data 192 and 194 include data representing items that the participants wish to trade. The second subsets of data for participants 170c and 172, for example, can relate to geometry data that, for example, game management servers 122b and 122d process.

In operation, when participant 170 logs in, synthetic environment generation platform 160 assigns that participant to game management servers 122b. By contrast, when participant 172 logs in, synthetic environment generation platform 160 assigns participant 172 to game management servers 122d. Participant 170 and 172 remain associated with game management servers 122b and 122d, respectively, during the session. Next, consider that both wish to engage in an activity at region two 165, as do many other participants that are not shown. Participant 170a enters synthetic environment 162 at region one 163, and then moves to region two 165 as participant 170b. As both regions one 163 and two 165 relate to a quasi aggregated process space 161, computational resources that otherwise would be required to manage cross-partition interactions are not needed when, for example, quasi aggregated process space 161 is accessed as a common process space. Participant 170c can further move to region three 167, and then to region four 169 as participant 170d. Note that as more participants enter region two 165, the increased number does not correspondingly bog down a server. This is because, according to various embodiments of the invention, game-related processes that generate synthetic environment 162 are not linked to geographic locations. In this example, no one game management server 122 bears the full burden, which can be amortized across game management processes 120 as a whole. Thus, hoards of participants can gather at one region without significantly overwhelming the performance of a single game management server 122.

Figure 2:
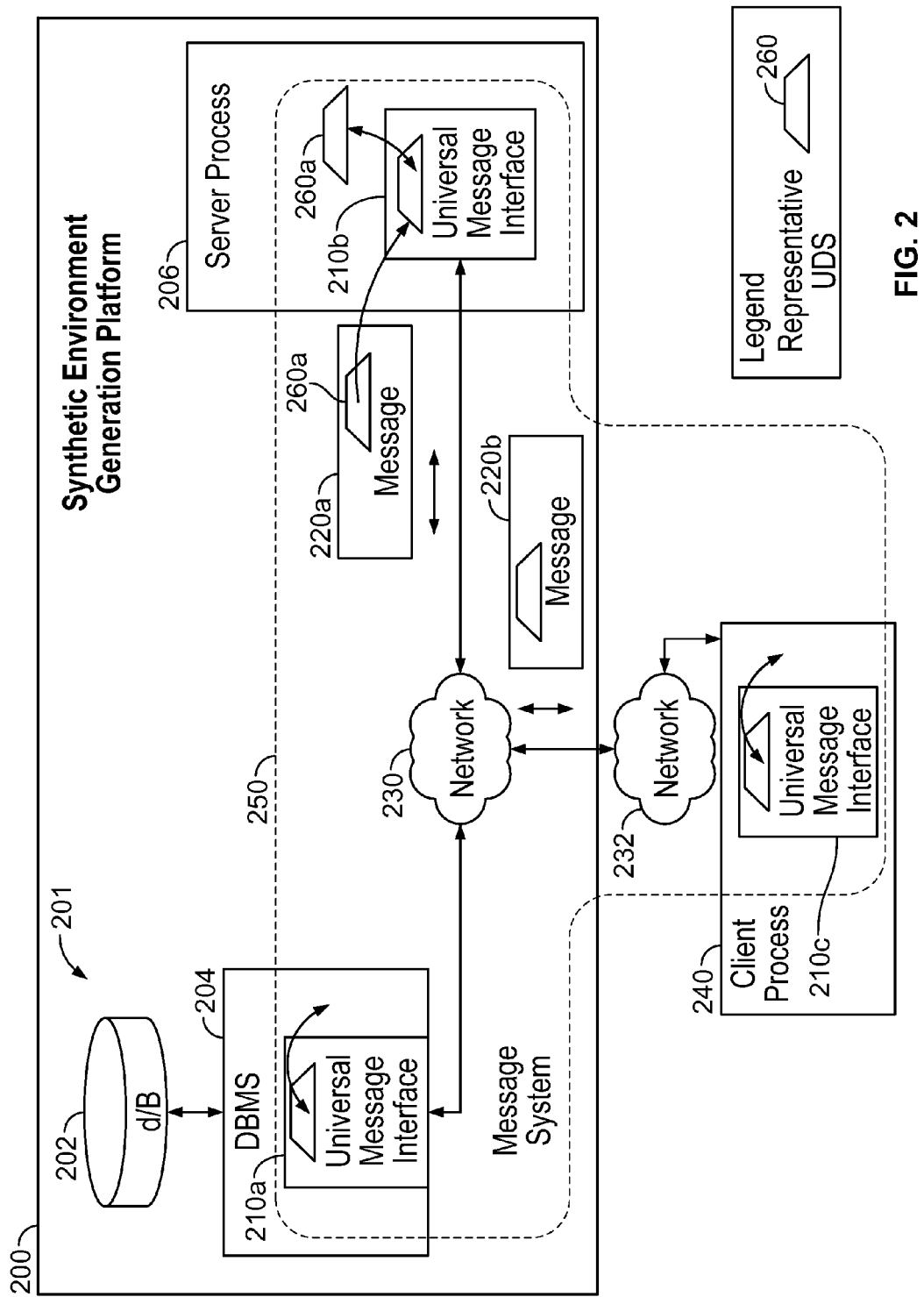
FIG. 2 is a diagram showing an example of a messaging system in accordance with at least one embodiment of the invention.

FIG. 2 is a diagram showing an example of a messaging system in accordance with at least one embodiment of the invention. FIG. 2 shows a synthetic environment generation platform 200 implementing at least a portion of a messaging system 250 configured to couple together, via a network 230, a database process 201, a server process 206, and a client process 240, all of which are nodes. Network 230 can be a computer network or any other type of communications network. Database process 201 includes a database ("d/B") 202 and a database management system ("DBMS") 204, which controls the organization, storage and retrieval of data in a database 202. In operation, messaging system 250 is configured to propagate messages, such as messages 220a and 220b, that include a universal data structure 260 for integrating data into a node (or a node process), such as server process 206. In particular, messaging system 250 is configured to exchange data among database process 201, a server process 206, and a client process 240 in a data arrangement that is useable by each of the processes. In one or more embodiments, the data arrangement associated with messages 220a and 220b is directly useable by each of the processes. For example, server process 206 can use data arranged in accordance with a universal data structure ("UDS") 260a used by message 220a. As such, database process 201, a server process 206, and a client process 240 need not require a conversion from a data structure associated with messages 220a and 220b into a different (or specialized) form that otherwise might be required by a specific node. Thus, executable code is absent that otherwise might be required to provide for such conversion.

A shown in FIG. 2, messaging system 250 can include a number of universal message interfaces, such as universal message interface 210a, universal message interface 210b, and universal message interface 210c, each of which can be configured to generate messages 220a and 220b for transmission throughout the synthetic environment generation platform and with client processes 240. Universal message interfaces 210a, 210b, and 210c can each be configured to receive messages 220a and 220b for integrating their data into a node process. Further, when universal data structures 260 are developed, recompiling executable code is not required that otherwise would be to convert one type of data structure into a different data structure. As used herein, the term "universal data structure," at least in one embodiment, refers to a representation of data that is universally useable by the nodes, as well as messages 220a and 220b, that do not require a conversion into some different (or specialized) data structure.

In various embodiments, universal message interfaces 210a, 210b, and 210c of FIG. 2 can be the same, or, alternatively, can differ to accommodate the node in which they relate. Universal message interfaces 210a, 210b, and 210c can be implemented internal to nodes, or, they can be disposed any where within a synthetic environment generation platform. In at least one embodiment, universal message interfaces 210a, 210b, and 210c each can be configured to broadcast messages, such as message 220a, out to any or all other nodes. As such, universal message interfaces 210a, 210b, and 210c each can be configured to detect whether each of the messages is intended for the node to which a universal message interface relates. In another embodiment, universal message interfaces 210a, 210b, and 210c each can be configured to transmit messages targeted to a destination. In one embodiment, messages between a client and the synthetic environment generation platform, such as message 220b, can be implemented in one or more User Datagram Protocol ("UDP") or Internet Protocol ("IP") packets. In one embodiment, messages among server processes 206 and database processes 201 can be implemented in one or more Transmission Control Protocol ("TCP") packets. In one embodiment, network 230 supports intra-platform communications for synthetic environment generation platform 200. In at least one embodiment, client process 240 is coupled via network 232 to synthetic environment generation platform 200. Network 232, in at least one embodiment, includes the Internet or any other communications network. In some instances, client process 240 exchanges messages with a database process 201 and/or a server process 206 via an intermediary process (not shown). An example of such an intermediary process is shown as user server of FIG. 12.

In one embodiment, universal data structure 260 is of a class of an object-oriented programming language, such as C++ or any other programming language. In another embodiment, all types of universal data structures 260 can relate to a single class. Universal message interfaces 210a, 210b, and 210c can determine an instance management schema configured to enable a node to implement (e.g., directly implement) data in universal data structure 260. In one embodiment, a node can include a reference to a schema that directs the node on how to implement universal data structure 260. In another embodiment, universal message 220a includes the reference. In some embodiments, universal message interfaces 210a, 210b, and 210c each can be configured to format the universal data structure in a platform-independent format, which can be used independent of processor and/or operating system. One example of a platform-independent format is a format defined by, for example, an extensible markup language, such as XML. XML is maintained by the World Wide Web Consortium ("W3C").

Figure 3:
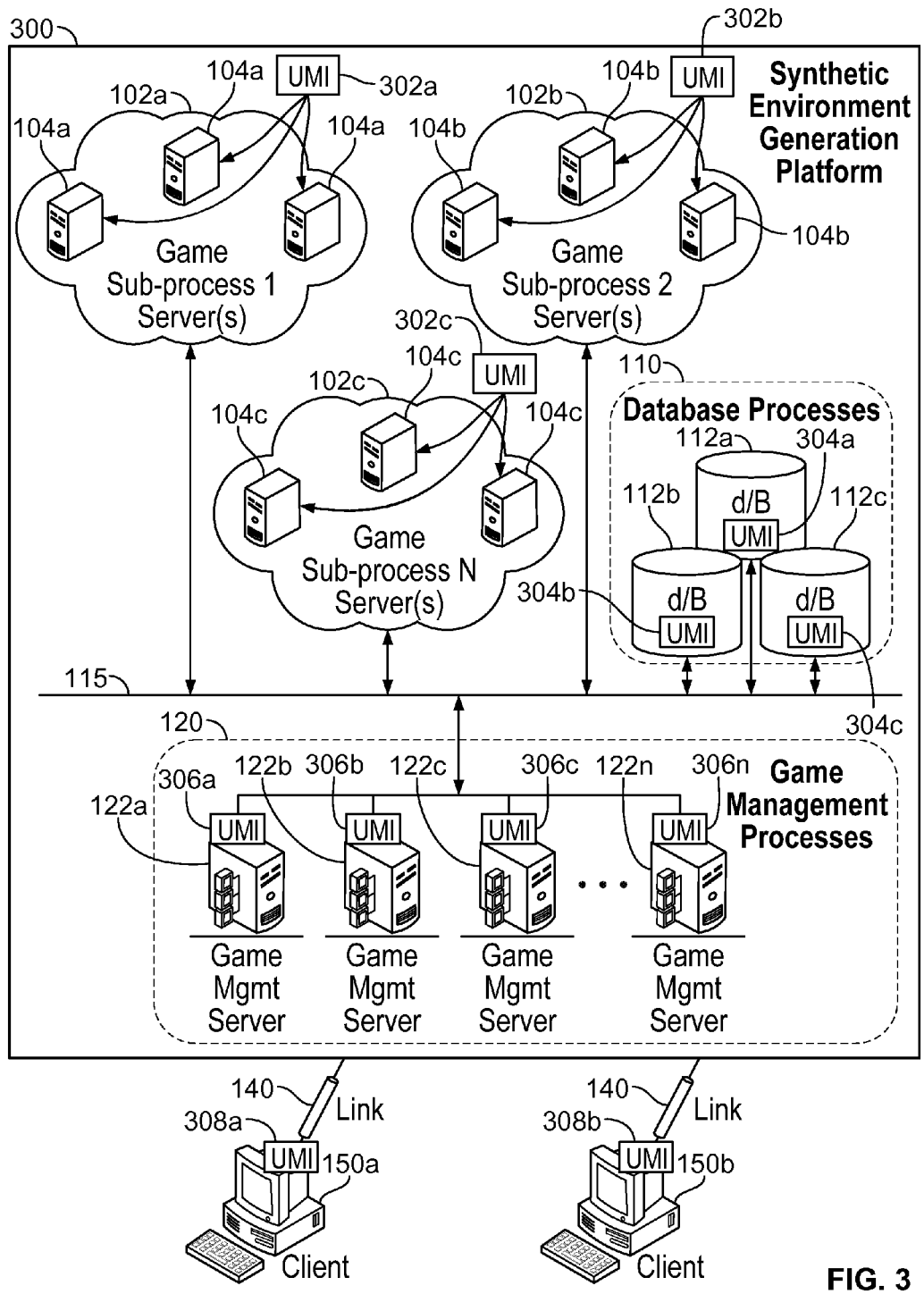
FIG. 3 depicts a system for generating synthetic environments that implement universal messaging interfaces in accordance with at least one embodiment of the invention.

FIG. 3 depicts a system for generating synthetic environments that implement universal messaging interfaces in accordance with at least one embodiment of the invention. In this example, a synthetic environment generation platform 300 includes universal message interfaces ("UMI") 302, 304, and 306 that are configured to transmit and/or receive universal data structure-based messages. As shown, universal message interfaces 302a, 302b, and 302c are disposed at or near game processes 102a, 102b, and 102c, respectively. Each of universal message interfaces 302a, 302b, and 302c is associated with a game subprocess server 104. In some cases, universal message interfaces 302a, 302b, and 302c each can have equivalent structure and/or functionality, and, in other cases, universal message interfaces 302a, 302b, and 302c can have different structures and/or functionalities. For example, a physics server might require a different universal message interface than, for example, an artificial intelligence server. FIG. 3 also shows that synthetic environment generation platform 300 includes universal message interfaces 304a, 304b, and 304c being disposed at or near databases 112a, 112b, and 112c, respectively, and universal message interfaces 306a, 306b, 306c, and 306n being disposed at or near game management servers 122a, 122b, 122c, and 122n, respectively. Universal message interfaces 308a and 308b are implemented in relation to clients 150a and 150b. Note that 304a, 304b, 304c, 306a, 306b, 306c, 306n, 308a, and 308b can have either equivalent or different structures and/or functionalities with respect to each other. Note, too, that similarly-named elements of FIG. 3 can have, in some cases, an equivalent structure and/or functionality as those elements set forth in FIG. 2.

Figure 4A:
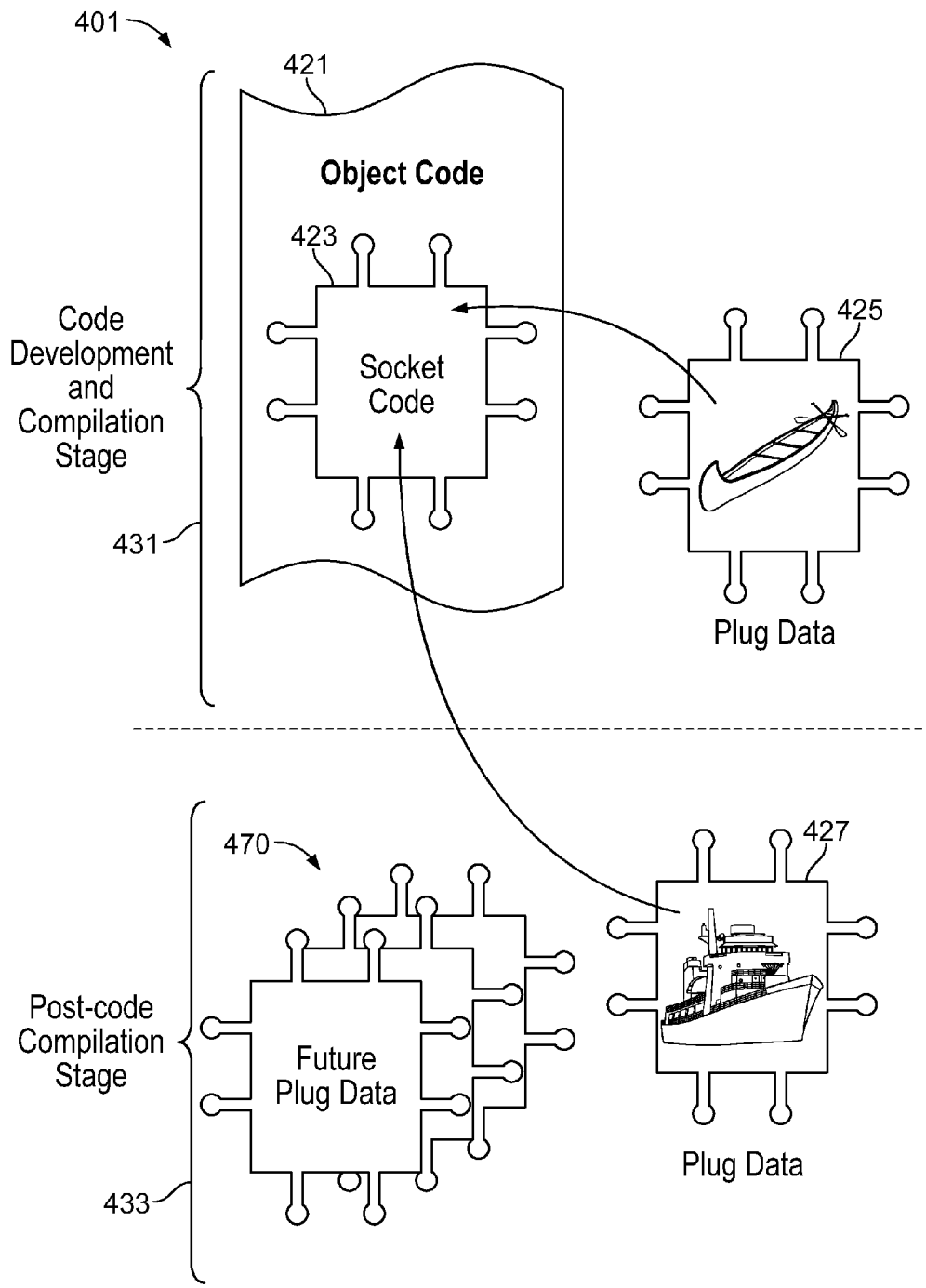
FIG. 4A depicts a method for introducing dynamic content into a synthetic environments, according to at least one embodiment of the invention.

FIG. 4A depicts a method for introducing dynamic content into a synthetic environment, according to at least one embodiment of the invention. Diagram 401 depicts the development of, for example, a massively multiplayer online ("MMO") game using a synthetic environment generation platform, according to one embodiment. During code development and compilation stage 431, game developers can generate and compile source code to form object code 421 as executable code. In developing the source code, socket code 423 can be generated and compiled. Socket code 423 includes executable instructions and/or inputs configured to access data from plug data 425. As such, plug data 425 can be developed in coordination with both socket code 423 and object code 421 as part of a quality assurance ("QA") process. After quality assurance metrics are met, both object code 421 (including socket code 423), and plug data 425 can be released for on-line gaming. Subsequent to code development and compilation stage 433, content developers can implement a synthetic environment generation platform to create other plug data 427 during a post-code compilation stage 433. During stage 433, plug data 427 can be created for use with socket code 423 without revising object code 421. For example, content developers can substitute an Aegis Cruiser as plug data 427 for a kayak that was formed by plug data 425, without modifying executable code. By foregoing a recompilation of the object code, developers can more quickly deliver new dynamic content into a synthetic environment implementing socket code 423. Further, future plug data 470 can be created without affecting the object code, thereby facilitating relatively rapid content development. As used herein, the term "dynamic content," at least in one embodiment, refers to content data that can be introduced into a synthetic environment as computer-generated visual and/or sound content, whereby the content data can be created independent to the modification of executable code with which the content data interacts. As such, content data can be developed without affecting object code.

Figure 4B:
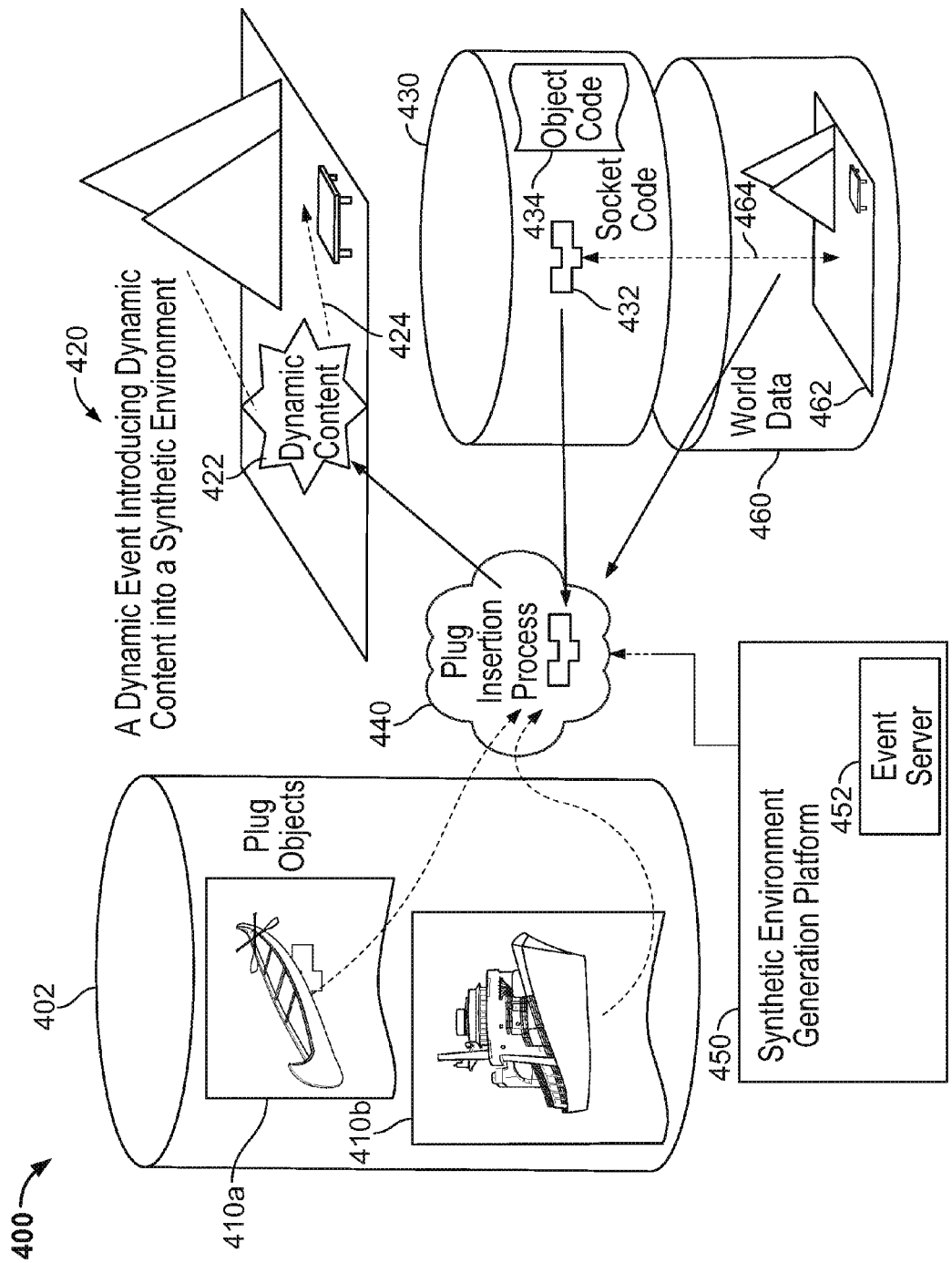
FIG. 4B depicts a synthetic environment generation platform configured to introduce dynamic content into a synthetic environment, according to at least one embodiment of the invention.

FIG. 4B depicts a synthetic environment generation platform configured to introduce dynamic content into a synthetic environment, according to at least one embodiment of the invention. In this example, system 400 includes a synthetic environment generation platform 450 that is configured to generate a synthetic environment 420 with which participants interact, and into which dynamic content 422 is introduced. System 400 includes data repositories 402, 430 and 460. In particular, data repository 402 is configured to store plug objects 410a and 410b that include content data for introducing a kayak and an Aegis cruiser, respectively, as dynamic content 422. Plug objects 410a and 410b can implement data arrangements similar to, or the same as, the universal data structures of the various embodiments. Plug objects 410a and 410b can also include data representing location, positioning, speed, and a path 424 along which a boat can sail. Data repository 430 is configured to store object code 434 for running, for example, a massively multiplayer online game. Data repository 430 is also configured to store socket code 432, which can form a portion of object code 434. Socket code 423 includes executable instructions and/or inputs configured to access data from plug data 425 (of FIG. 4A) for use by object code 434 to effectuate generation of dynamic content 422. Data repository 460 is configured to store world data 462 to form synthetic environment 420. World data 462 and socket code 432 can share a relationship 464 for defining the locations at which socket code 423 will introduce dynamic content 422.

Synthetic environment generation platform 450 includes an event server 452, which is configured to introduce dynamic content 422 into at least a portion of synthetic environment 420. The dynamic content 422 can be introduced substantially coincident to the execution of object code instructions to generate synthetic environment 420. As such, synthetic environment generation platform 450 can be configured to initialize a plug insertion process 440, during which one of plug objects 410a and 410b is inserted into socket code 432 to instantiate dynamic content 422. In a specific embodiment, event server 452 is configured to introduce dynamic content 422 without modifying object code 434. In one embodiment, plug objects 410a and 410b belong to a system of universal objects that includes at least one universal data structure. Further, plug objects 410a and 410b, and the system of universal objects, obviate recompilation of object code instructions 434 to introduce dynamic content 422. By implementing plug objects 410 and socket code 432, at least one game management server can be configured to generate dynamic content 422 without rebooting, such as after implementing modified object code.

Figure 5:
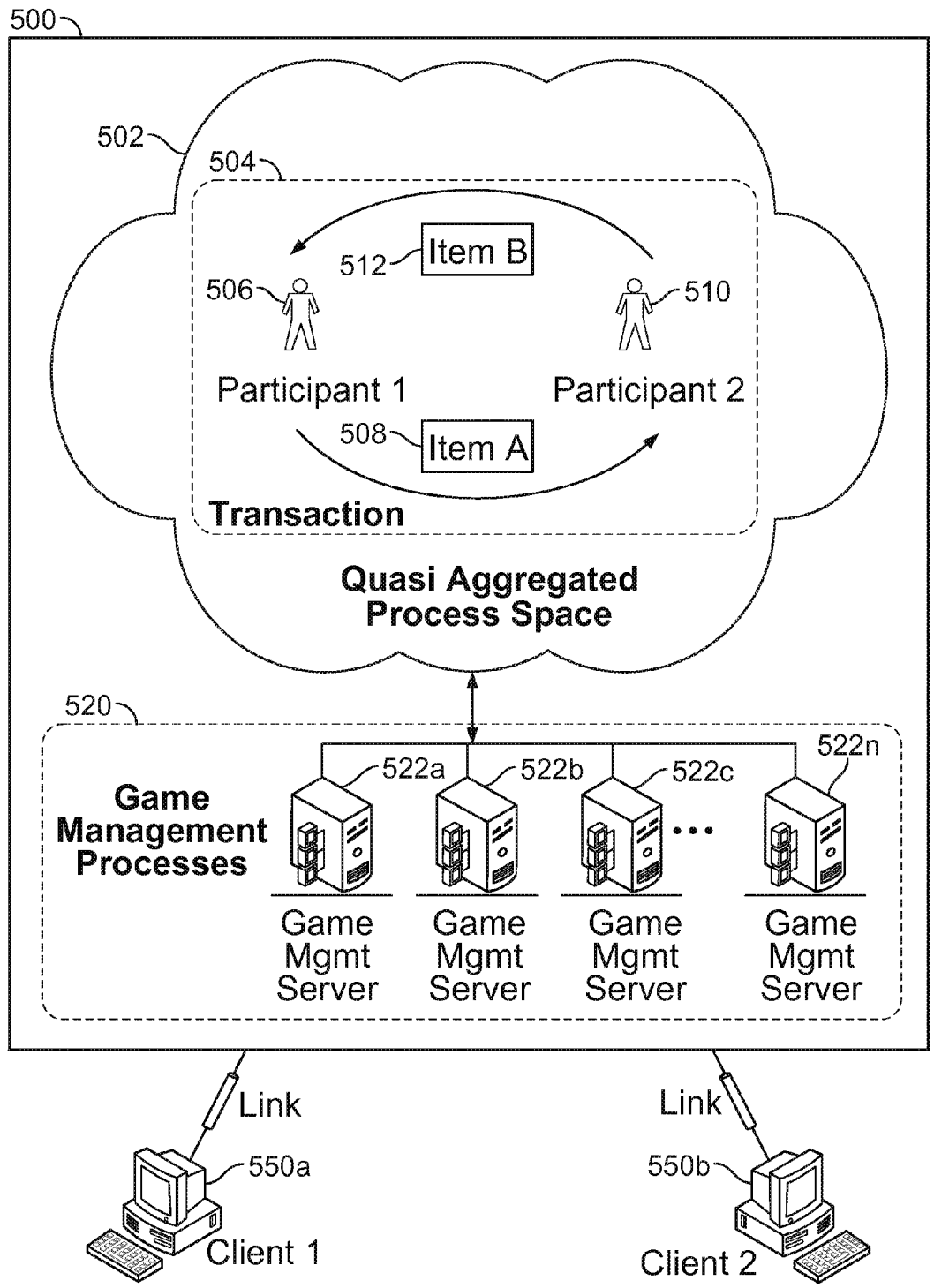
FIG. 5 is an illustration of a quasi aggregated process space for use in generating synthetic environments in accordance with at least one embodiment of the invention.

FIG. 5 is an illustration of a process space for use in generating synthetic environments in accordance with at least one embodiment of the invention. Here, a synthetic environment generation platform 500 is configured to generate a synthetic environment for clients 550a and 550b. Synthetic environment generation platform 500 includes game management processes 520 implemented by game management ("mgmt") servers 522a to 522n. Synthetic environment generation platform 500 also includes quasi aggregated process space 502 in which transactions, such as transaction 504, can be implemented as an atomic transaction. As such, either the all parts of a transaction are performed or none of them is. To illustrate, consider an example in which a first participant ("participant 1") 506 is associated with client 550a, and a second participant ("participant 2") 510 is associated with client 550b. First participant 506 and second participant 510 respectively possess an item ("Item A") 508 and an item ("Item B") 512. Next, consider that the participants 506 and 510 arrange to exchange items 508 and 512, but have yet to confirm their wishes. Once both participants 506 and 510 agree to the exchange, the transaction is finalized. During transactions such as this, quasi aggregated process space 502 is configured to behave a common process space, thereby making transaction 504 less vulnerable to manipulation. In one embodiment, a transaction server (not shown) operates to either interact with or provide quasi aggregated process space 502. According to one embodiment, quasi aggregated process space 502 emulates a common process space, and as such, enables participants to transfer readily among different synthetic environments created by different synthetic environment generation platforms 500. As used herein, the term "transaction," at least in one embodiment, refers to a set of tasks constituting an activity that involves one or more participants interacting with a synthetic environment.

Figure 6:
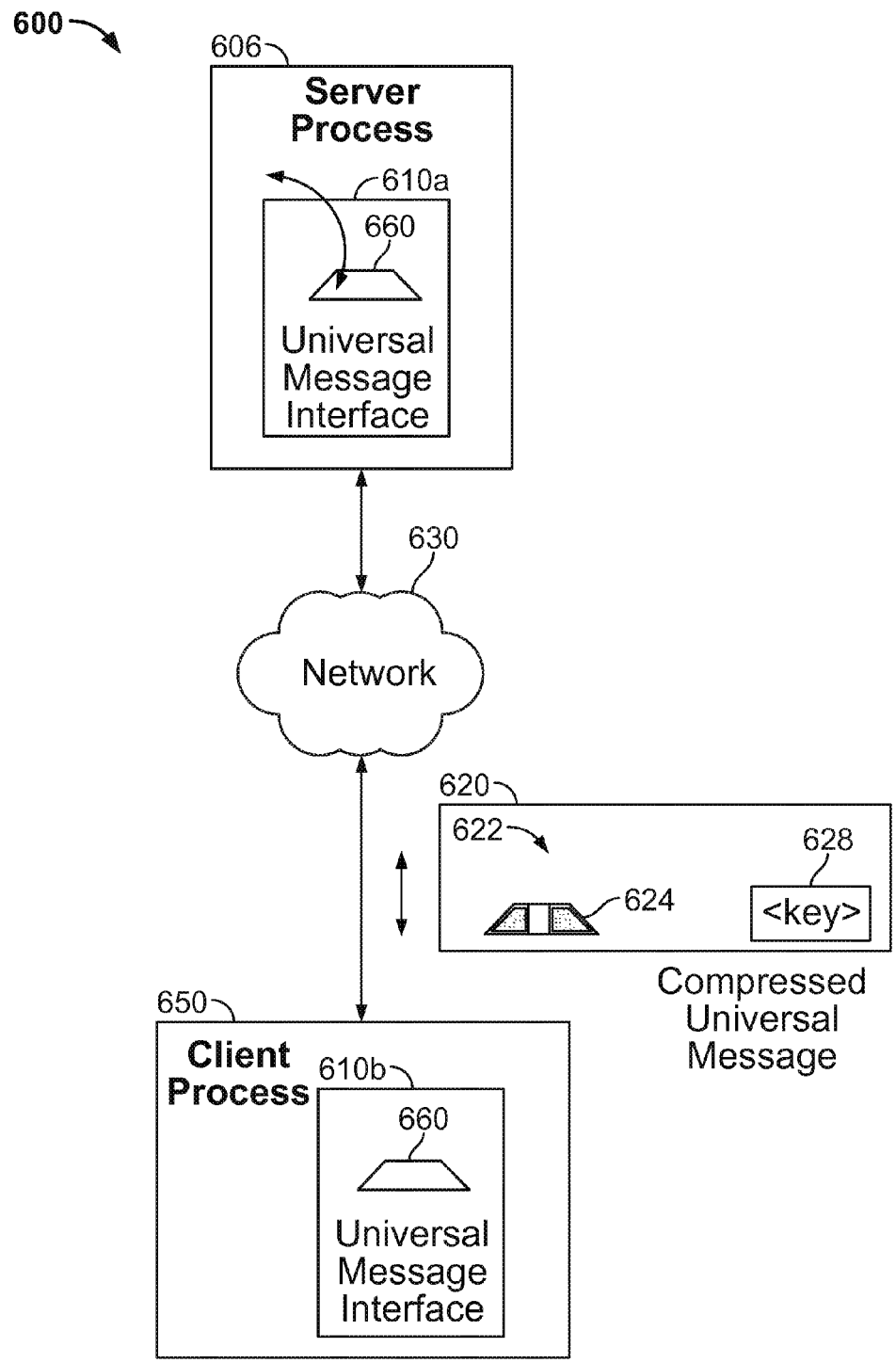
FIG. 6 is a diagram showing an example of a portion of a messaging system implementing a compressed universal message, according to at least one embodiment of the invention.

FIG. 6 is a diagram showing an example of a portion of a messaging system implementing a compressed universal message, according to at least one embodiment of the invention. Here, message system portion 600 includes a server process 606 and a client process 650, both of which are coupled via a network 630 for exchanging messages, among other things. In this example, message system portion 600 can transport a subset of data associated with a server-side (or a client-side) universal data structure 660, such as in response to client process 650 indicating a modification to the synthetic environment. Server process 606 and client process 650 respectively include universal message interface 610a and universal message interface 610b. Server process 606 can use data arranged in accordance with a universal data structure ("UDS") 660 to, in whole or in part, generate a synthetic environment in response to game data modifications transmitted from client process 650. An example of modified game data is the game data generated by client process 650 that indicates movement by an avatar. In at least one embodiment, server process 606 and/or client process 650 can exchange messages as a compressed universal message 620. As both server process 606 and client process 650 can implement universal data structure 660 with which to exchange data, a reduced amount of data can be exchanged in compressed universal message 620. In particular, only modified game data 624 associated with universal data structure 622 need be transported in a universal message. In one embodiment, compressed universal message 620 also includes a key 628 specifying which attribute modified game data 624 relates. With this information, server process 606 can modify the synthetic environment.

Figure 7:
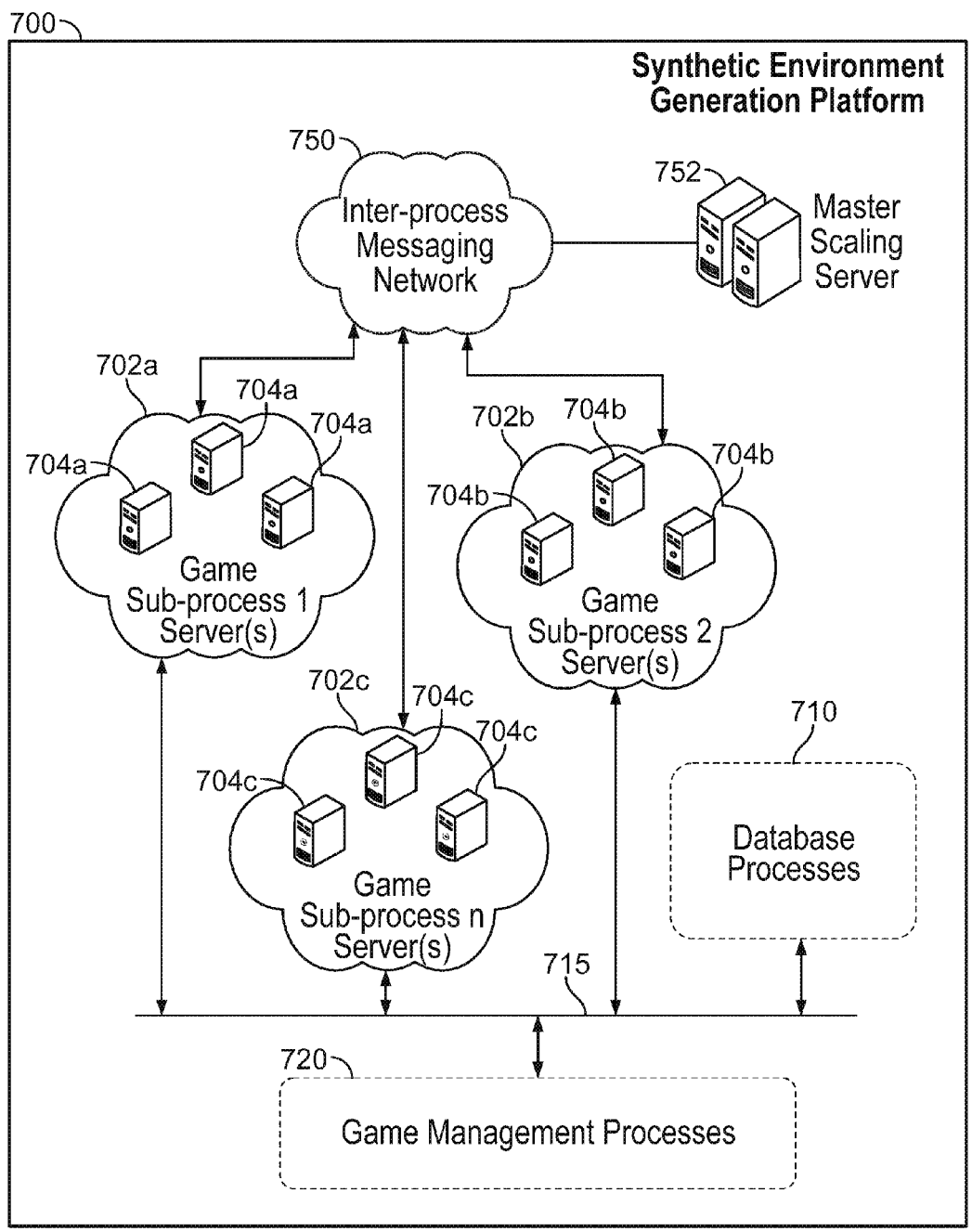
FIG. 7 depicts a system for generating synthetic environments that implement a master scaling server, according to at least one embodiment of the invention.

FIG. 7 depicts a system for generating synthetic environments that implement a master scaling server, according to at least one embodiment of the invention. Synthetic environment generation platform 700 includes an inter-process messaging network 750 and a master scaling server 752, both of which are configured to scale game subprocess capabilities to satisfy variations in demand for game subprocesses, such as physics processes and artificial intelligence processes. Synthetic environment generation platform 700 also includes various game subprocesses 702, database processes 710, and game management processes 720. In operation, master scaling server 752 is configured to add or remove game subprocess servers as appropriate. For example, if more physics processing is needed, master scaling server 752 can add additional physics servers. But if less artificial intelligence is needed, master scaling server 752 can take artificial intelligence servers off-line.

Master scaling server 752 is configured to monitor a list of servers, which also includes information about the type of server (e.g., whether a server is a physics server, artificial intelligence server, etc.), the synthetic environment to which game subprocess server 702 belongs, and the like. Master scaling server 752 is also configured to monitor request messages for additional game subprocesses via inter-process messaging network 750 from, for example, one or more game management servers requiring additional services or capacity. In response, master scaling server 752 can coordinate establishment of connections among a newly-added game subprocess server, such as any of game subprocess servers 704a, 704b, and 704c, and a requesting server, such as a game management server.

In one embodiment, a scaleable game subprocess server is configured, when brought on-line, to communicate its identity and other related information to master scaling server 752. The other related information can include a server type, an associated synthetic environment to which it belongs, etc. In response, master scaling server 752 dynamically allocates the scaleable game subprocess server to, for example, a game management server requiring such a server type. In particular, master scaling server 752 sends a command and connection information (e.g., host and port information) to the scaleable game subprocess server to connect to the requesting game management server. In some cases, master scaling server 752 communicates connection information (e.g., host and port information) to the requesting game management server to receive a connection from the scaleable game subprocess server. In at least one embodiment, master scaling server 752 can be configured to monitor the loading of game management servers, and, automatically add or remove game subprocess servers. In one embodiment, an inter-process messaging network 750 is coextensive with or is the same as a universal messaging system implemented over network 715.

Figure 8:
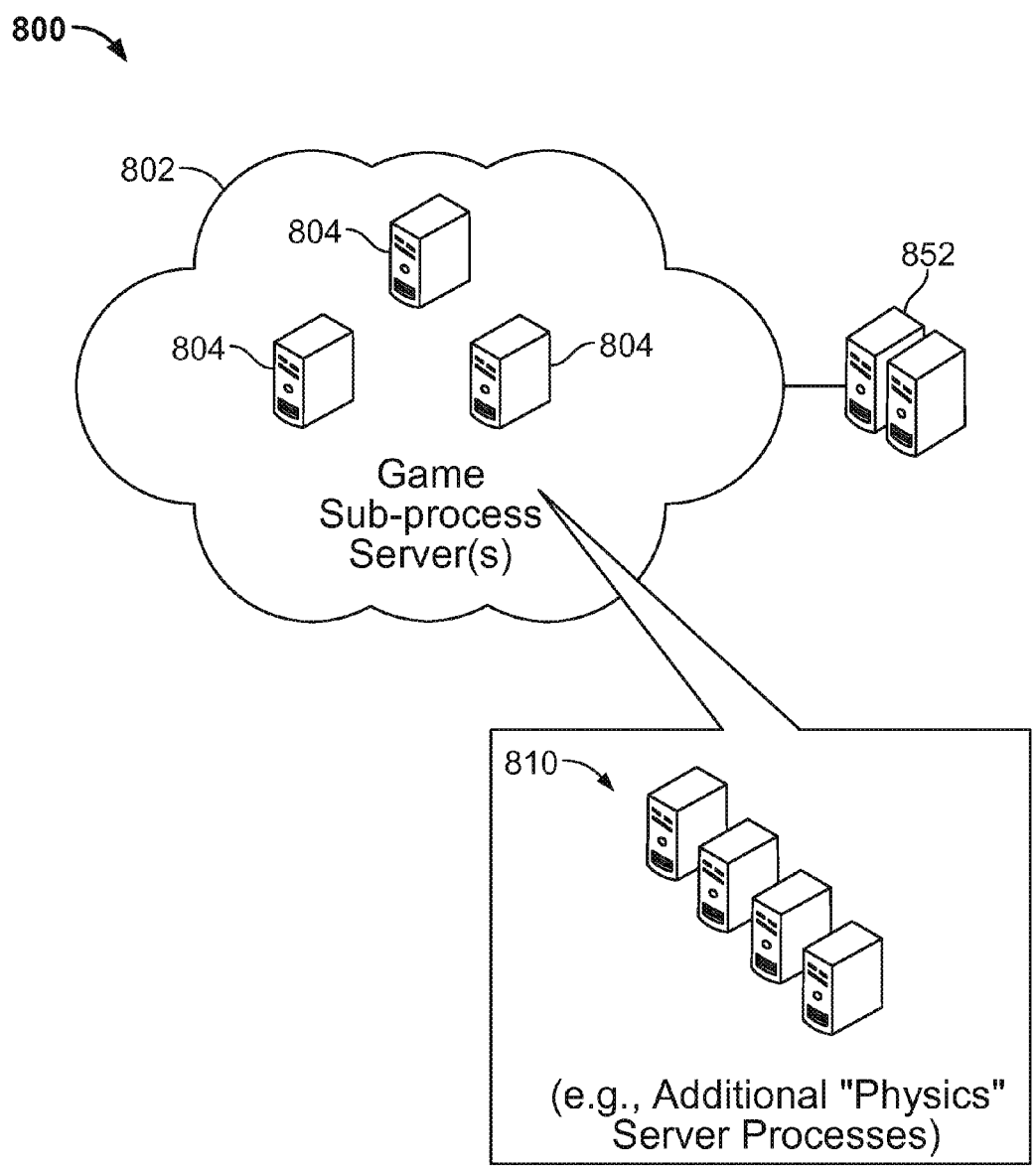
FIG. 8 is a diagram showing an example of a master scaling server adding scaleable game subprocess servers, according to at least one embodiment of the invention.

FIG. 8 is a diagram showing an example of a master scaling server adding scaleable game subprocess servers, according to at least one embodiment of the invention. In particular, diagram 800 depicts game subprocess servers 804 providing a game subprocess 802 that is used by a game management server (not shown). Also shown, master scaling server 852 is adding scaleable physics servers 810 to boost physics processing capabilities. In one embodiment, scaleable physics servers 810 and game subprocess servers 804 are each homogeneous hardware platforms. With homogeneous hardware platforms, master scaling server 852 can increase the flexibility for scaling up and down as necessary.

Figure 9:
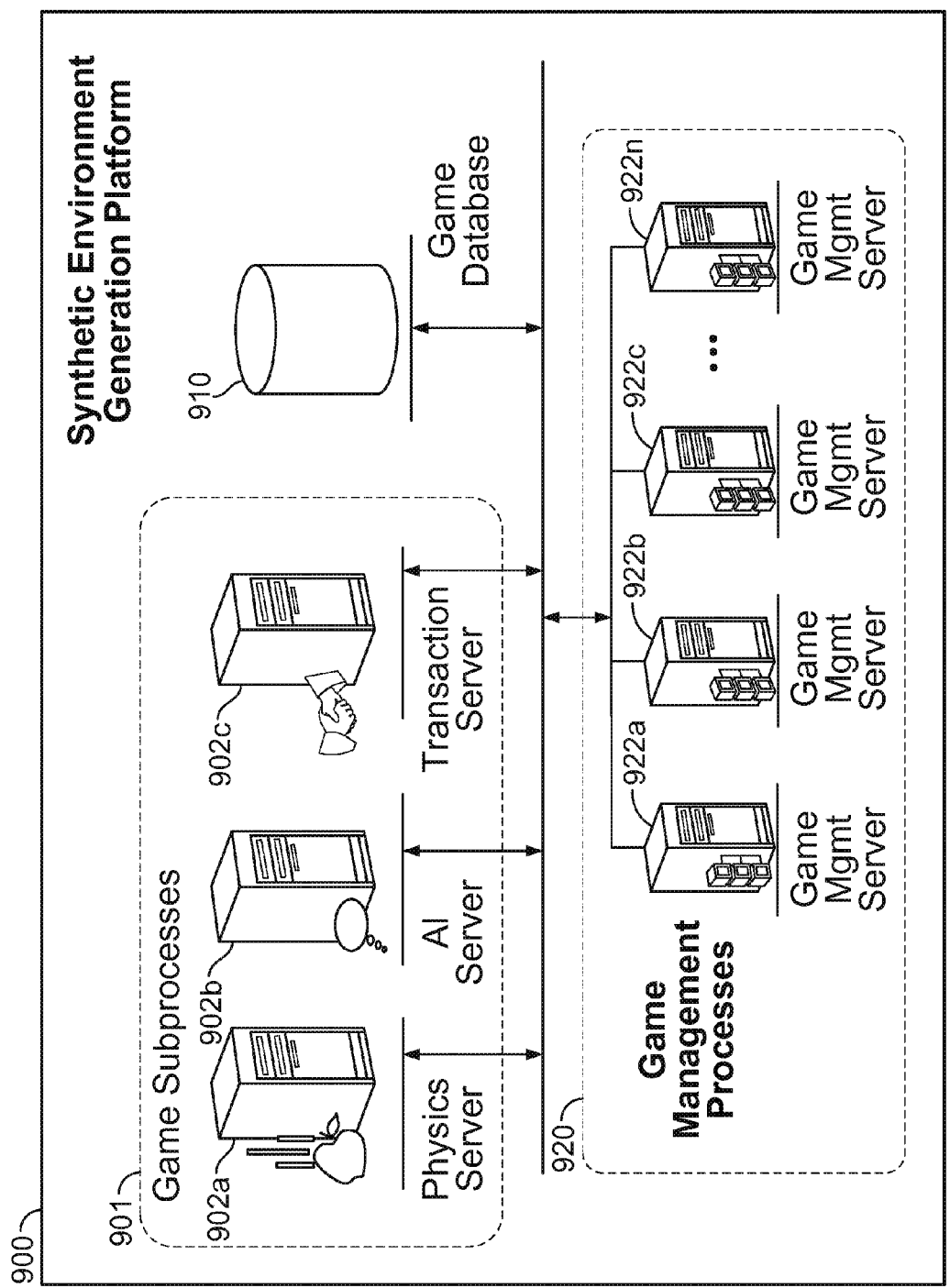
FIG. 9 is an illustration of a synthetic environment generation platform implementing specific implementations of game subprocess servers, according to at least one embodiment of the invention.

FIG. 9 is an illustration of a synthetic environment generation platform implementing specific types of game subprocess servers, according to at least one embodiment of the invention. Synthetic environment generation platform 900 includes game subprocesses 901, a game database 910 configured to store game data, and game management processes 920, which include game management servers 922a to 922n. In this example, game subprocesses 901 include the following specific types of game subprocess servers: a physics server 902a, an artificial intelligence ("AI") server 902b, and a transaction server 902c. By implementing these game subprocesses in separate servers, synthetic environment generation platform 900 is less susceptible to problems associated with a game subprocess. Further, certain game subprocesses can be scaled appropriately to meet a demand independent from other game subprocess needs.

Figure 11:
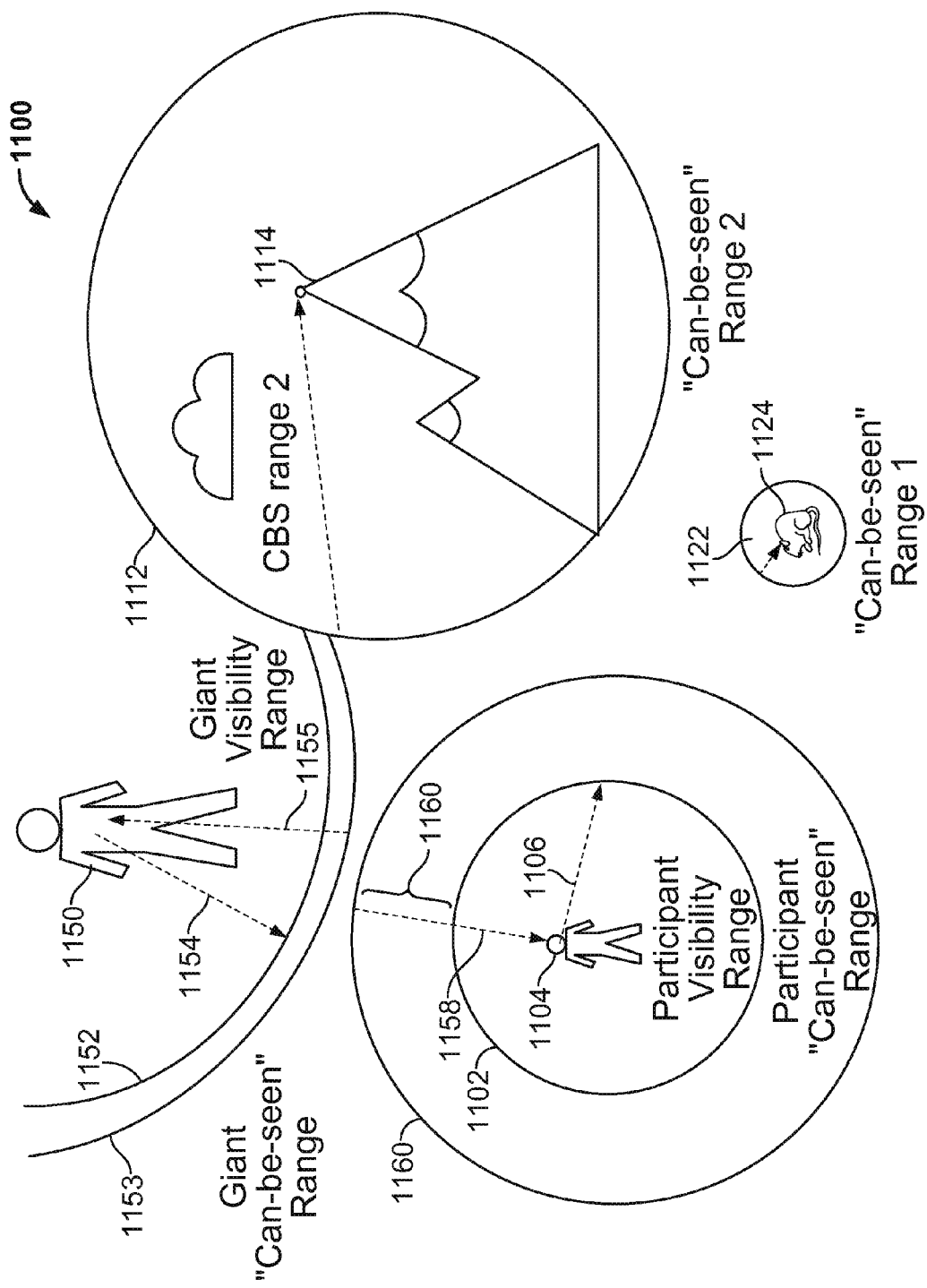
FIG. 11 is a diagram showing a technique for determining visibility, according to at least one embodiment of the invention.

Physics server 902a represents one or more physics servers configured to process movement and collision detection activity for the synthetic environment. In various embodiments, physics server 902a can also perform any of the following: visibility determinations, instancing, movement validation and/or path segmenting for artificially intelligent NPCs. In making visibility determinations, physics server 902a calculates whether objects and/or other participants in a synthetic world are visible to a participant. An entity is visible to a participant when that entity is within a visibility range of the participant, where physics server 902a determines whether the entity is in the visibility range. FIG. 11 illustrates an alternate technique for determining visibility, according to an embodiment of the invention. Referring back to FIG. 9, physics server 902a also can be configured to provide "instancing," whereby a collection of participants (and associated physics processing) perform activities within a portion of the synthetic environment, such as in a virtual house, or in an area at which they will band together to fight an NPC, such as a boss monster.

Movement validation is the act of validating the movement of a participant in the context of the synthetic environment. Physics server 902a can be configured to validate movement against the virtual terrain and any entities (i.e., other characters and/or objects) that are in the path of the desired movement. Based on the rate at which the participant's avatar moves relative to the virtual terrain, the location of the participant can be modified to reflect its location in the synthetic environment. Physics server 902a can run a simulation to validate that the location is correct before sending modified game data to the clients. Physics server 902a can also be configured to validate movement of a participant to ensure that participant is permitted to either engage in certain activities or move within certain areas of the synthetic environment. In one embodiment, physics server 902a validates a subset of participants per unit time, and cycles through different subsets over time. Any participant that is not authorized to move about or at certain areas of a synthetic environment, then that participant can be tagged as being suspected of performing an exploit. Further, physics server 902a can provide path segments to artificial intelligence ("AI") server 902b so that NPCs can avoid objects that other would block movement of an NPC, due to the terrain and/or static objects. In various embodiments, one or more of the above-discussed physics processes can be implemented as separate processes in separate servers.

Artificial intelligence ("AI") server 902b represents one or more artificial intelligence servers configured to provide computer-implemented non-player characters ("NPCs") and the like with artificial intelligence to determine the behavior of NPCs. Additional artificial intelligence servers 902b can be added to support the synthetic environment during increased demands for artificial intelligence. For example, if an event requires a large number of NPCs, then additional artificial intelligence servers 902b can be added. In one embodiment, a participant can assume control of an NPC to "play the monster."

Transaction server 902c represents one or more transactions servers configured to process, among other things, runtime participant game data, regardless of the location of the participant. As such, transaction server 902c includes a cache 903 to facilitate character (i.e., participant) movement between, for example, a persistent world (i.e., a synthetic environment) and an instance (i.e., a portion of the synthetic environment, such as in virtual building). Using cache 903 avoids having to reload game data from the database as the participant moves between synthetic environments and portions thereof. In some embodiments, representations of game data are marked as read-only in processes other than transaction server 902c to, for example, avoid manipulation of transactions. Further, transaction server 902c facilitates atomic transactions within a quasi aggregated process space. While transaction server 902c performs transactions, game management servers 922a to 922n can be configured to validate participants to confirm their identities prior to transaction server 902c modifying the data in response to a transaction.

Figure 10:
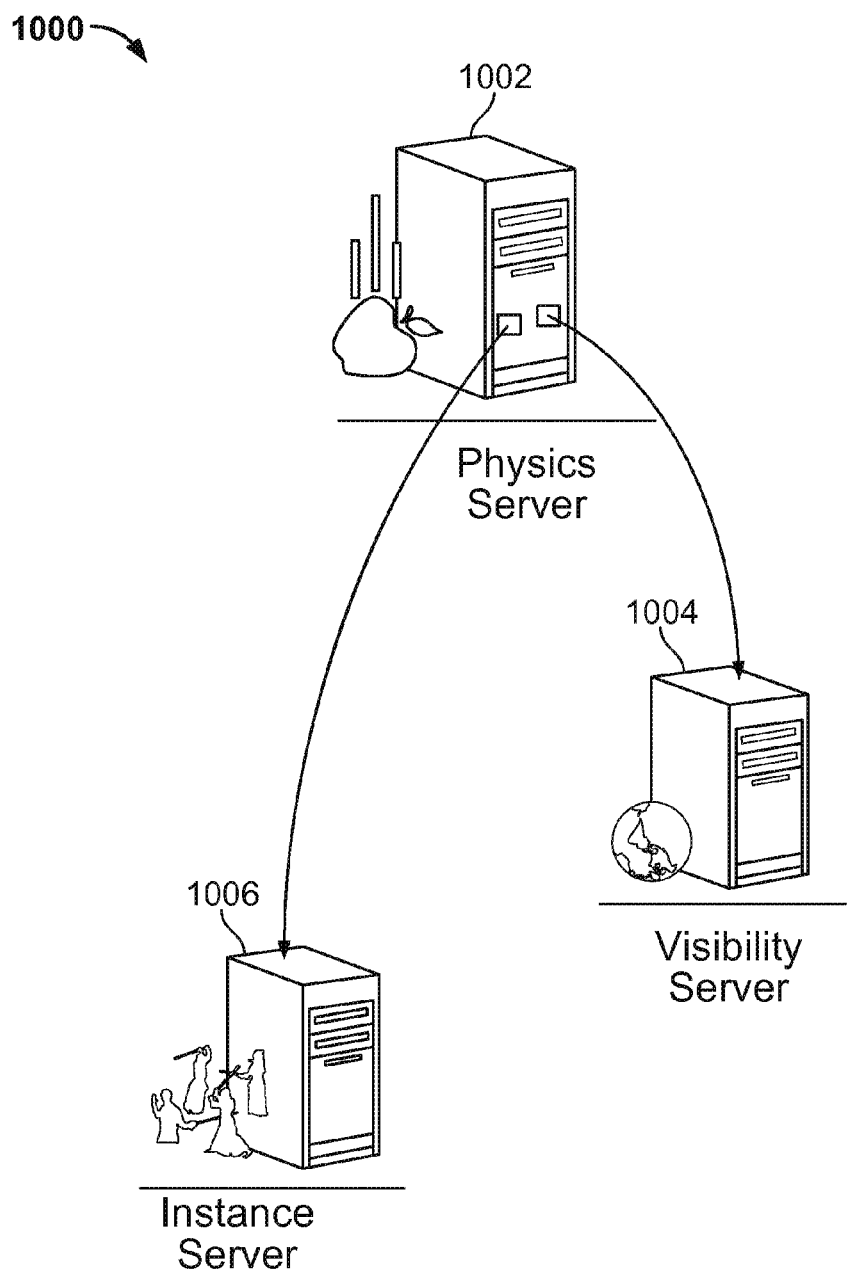
FIG. 10 is a diagram showing an implementation of physics processes, according to at least one embodiment of the invention.

FIG. 10 is a diagram showing an implementation of physics processes, according to at least one embodiment of the invention. Diagram 1000 shows visibility processes and instancing processes being off-loaded from physics server 1002 into separate visibility server 1004 and instance server 1006, respectively. Visibility server 1004 is configured to determine whether objects and/or other participants in a synthetic world are visible to a participant. Instance server 1006 is configured to providing "instancing," whereby a collection of participants and associated physics processing for performing a group or localized activity within a portion of the synthetic environment. With visibility processes and instancing processes being separate from the physics processes for the synthetic environment, physics server 1002 is less burdened. Further, visibility server 1004 and instance server 1006 are less susceptible to problems relating to physics server 1002.

FIG. 11 is a diagram showing a technique for determining visibility, according to at least one embodiment of the invention. Diagram 1100 illustrates an example of a technique for determining the visibility for a participant 1104. In one case, a visibility server first defines a visibility range 1102 for defining participant 1104. As such, participant can see objects at a distance 1106. In at least one embodiment, objects, NPCs, and other players each are associated with a "can-be-seen" range. Larger objects, such as a mountain 1114, can have a larger "can-be-seen" range 1112, than smaller objects, such as a mouse 1124, which has a "can-be-seen" range 1122. In one embodiment, a visibility server is configured to implement a sphere intersection test in which an object becomes visible to participant when a "can-be-seen" range, such as "can-be-seen" range 1112 for mountain 1114, intersects with visibility range 1102. A "can-be-seen" range can be represented as a circle (i.e., 2-D) or a sphere (i.e., 3-D). Note that in a specific embodiment, participant 1104 has two ranges: (1.) a participant visibility range defined by sphere 1102, and (2.) a "can-be-seen" range 1160 at which other entities can see participant 1104 if the entity or its visibility range intersects "can-be-seen" range 1160. Next, consider that a giant 1150 has a visibility range 1152 at a distance 1154 from the giant, and has a "can-be-seen" range 1153 at a distance of 1155 from the giant. Further, participant 1104 has a "can-be-seen" range 1160 at a distance of 1158 from participant 1104. So when giant 1150 approaches participant 1104, and its visibility range 1152 intersects "can-be-seen" range 1160, then giant 1150 can see participant 1104. But when visibility range 1152 is within a visibility gap 1160, the participant cannot see giant 1154. Note that once visibility range 1152 intersects visibility range 1102, then participant 1104 can see giant 1150. In view of the foregoing, diagram 1100 illustrates an example for a technique to determine visibility that reduces unnatural visual effects (e.g., entities appear to "pop up" when they cross visibility range 1102) that can occur when only a visibility ranged is used to determine visibility. While not shown, mouse 1124 also can have a visibility range. In various embodiments, non-player characters ("NPCs") and participants each can have a visibility range and a "can-be-seen" range.

Figure 12:
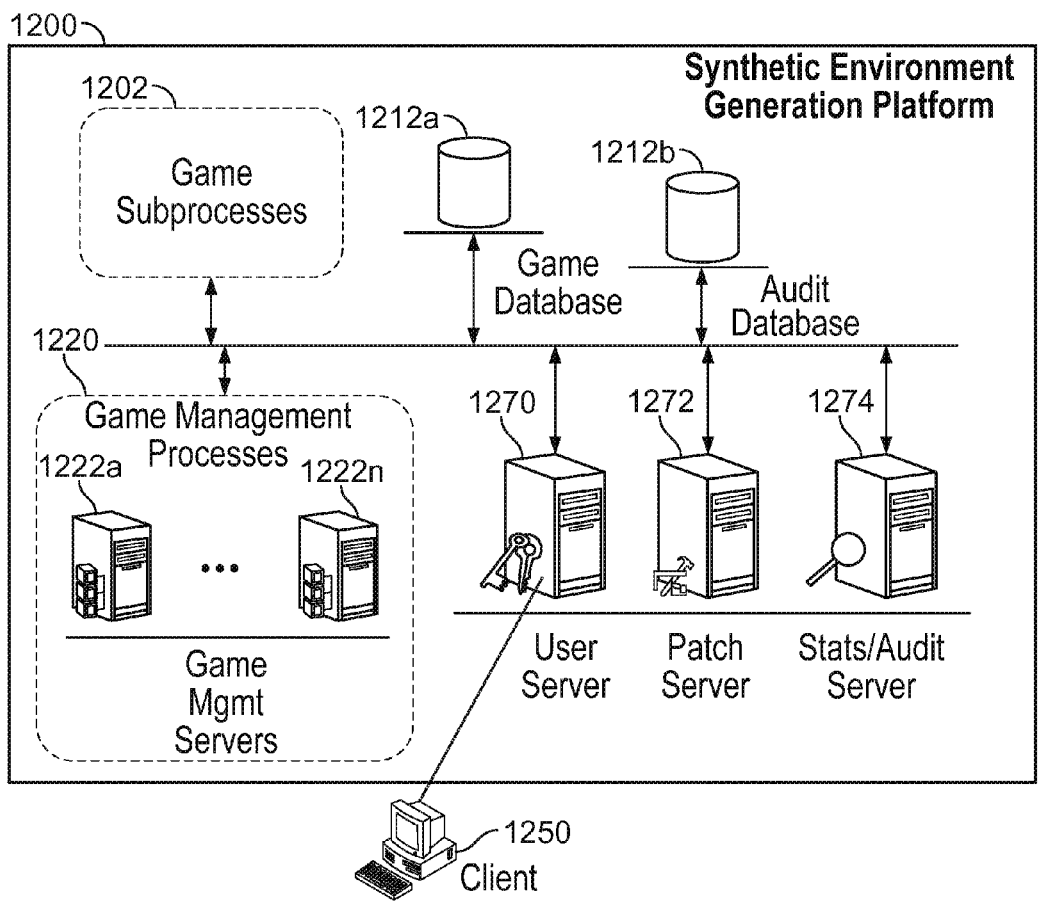
FIG. 12 is an illustration of a synthetic environment generation platform implementing additional types of game subprocess servers, according to at least one embodiment of the invention.

FIG. 12 is an illustration of a synthetic environment generation platform implementing additional types of game subprocess servers, according to at least one embodiment of the invention. Synthetic environment generation platform 1200 includes game subprocesses 1202, a game database 1212a configured to store game data, an audit database 1212b configured to store audit data (i.e., a record of all or most interactions by each participant) and statistical data, and game management processes 1220, which include game management servers 1222a to 1222n. In addition, synthetic environment generation platform 1200 includes a user server 1270, a patch server 1272 and a stats/audit server 1274.

User server 1270 can be configured to route messages between any of game management servers 1222a to 1222n and client 1250. However, once a participant logs in to interact with the synthetic environment, user server 1270 will assign participant and its client 1250 to one of game management servers 1222a to 1222n. Thereafter, user server 1270 can relay messages to and from one of game management servers 1222 and the participant. During the session, the participant can retain a relationship with the same game management server. User server 1270 can also be configured to connect clients 1250 in a manner that distributes client connections evenly across game management servers 1222a to 1222n, thereby effecting load balancing. In some cases, user server 1270 can also be configured to authenticate participants upon signing on. In at least one instance, user server 1270 can selectively encrypt data exchanged between game management servers 1222a to 1222n and client 1250. In one embodiment, user server 1270 foregoes encrypting movement-related messages, which are a predominant amount of messages. As such, the delays associated with encryption are reduced. Patch server 1272 can be configured to incrementally transmit patches to client 1250, such as on a file-by-file basis. In at least one embodiment, patch server 1272 is configured to trickle patches at an opportune time, such as at login, as well as during game play (i.e., during interactions by a participant with a synthetic environment). Stats/audit server 1274 is configured to collect and use statistics for participant use and/or for triggering events in connection with an event server.

Figure 13:
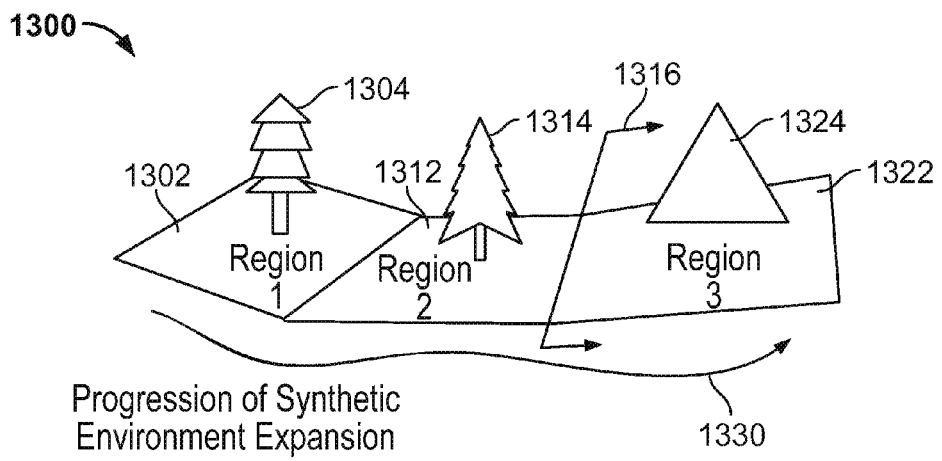
FIG. 13 is a diagram showing a technique for enabling game play during patching, according to at least one embodiment of the invention.

FIG. 13 is a diagram showing a technique for enabling game play during patching, according to at least one embodiment of the invention. Diagram 1300 illustrates regions added as new "worlds," "continents" or synthetic environments. The progression of synthetic environment expansion is shown by arrow 1330. Consider that region ("1") 1302 was implemented with an originally downloaded game. Next, consider that region ("2") 1312 represents an expanded synthetic environment for which a participant downloaded a patch. Lastly, consider that the participant has yet to implement the next patch for region ("3") 1322, but wishes to enter region 1322 from region 1302. As the participant travels from region 1302 to region 1312, the participant will observe tree 1304 and tree 1314. But as participant passes over delineation 1316, the participant will be in a local that has yet to be completed. As such, synthetic environment generation platform will display a proxy asset (i.e., a substitute object) 1324 if the patching data to render a tree is yet to be completed. As such, the participant need not be prohibited from entering the new region 1322, but might experience fill-in objects until the patching process is completed.

Figure 14:
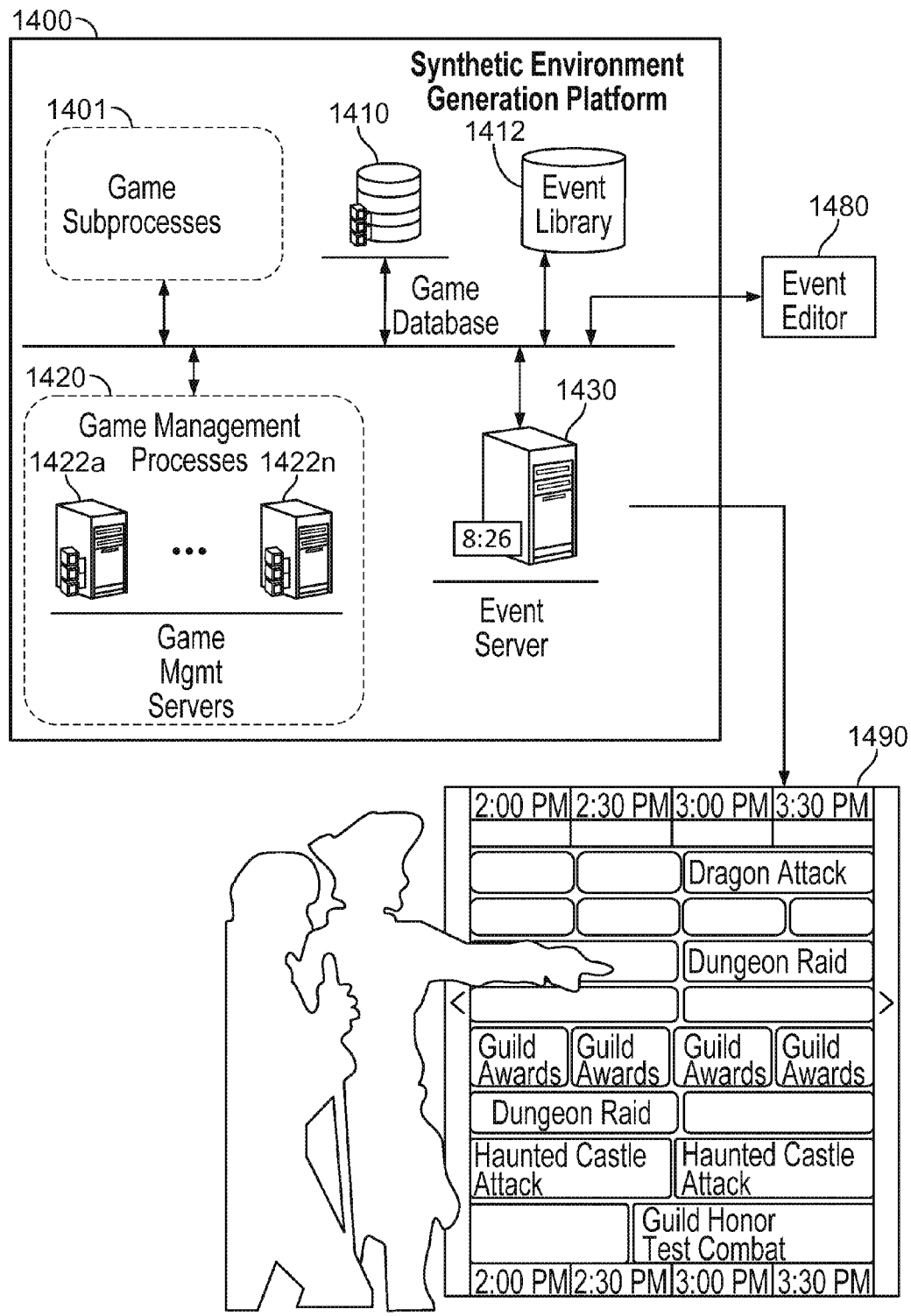
FIG. 14 is an illustration of a synthetic environment generation platform implementing an event server and an event editor, according to at least one embodiment of the invention.

FIG. 14 is an illustration of a synthetic environment generation platform implementing an event server and an event editor, according to at least one embodiment of the invention. Synthetic environment generation platform 1400 includes game subprocesses 1401, a game database 1410 configured to store game data, and game management processes 1420, which include game management servers 1422a to 1422n. Synthetic environment generation platform 1400 also includes an event server 1430 and an event editor 1480. Event server 1430 is configured to control the introduction of dynamic content into synthetic environments as a function, for example, of player activity, such as triggering a predetermined trigger or condition, and/or pre-determined scheduling. For example, if a number of participants congregating at a specific location surpass a trigger point, then event server 1430 can trigger introduction of dynamic content. In some embodiments, event server 1430 can modify the types of ships or creatures that are spawned. Event server 1430 is configured to access plug objects from event library database 1412 to generate dynamic content. In one embodiment, event server 1430 is configured to generate data to drive an Event Server Guide 1490 that displays programmed events for participants to preview and join those events. Event editor 1480 is configured to aggregate plug objects in association with a number of sockets to introduce varying amount of dynamic content, whereby the collection of plug objects can introduce creatures, trees, structures, and the like into a synthetic environment.

Figure 15:
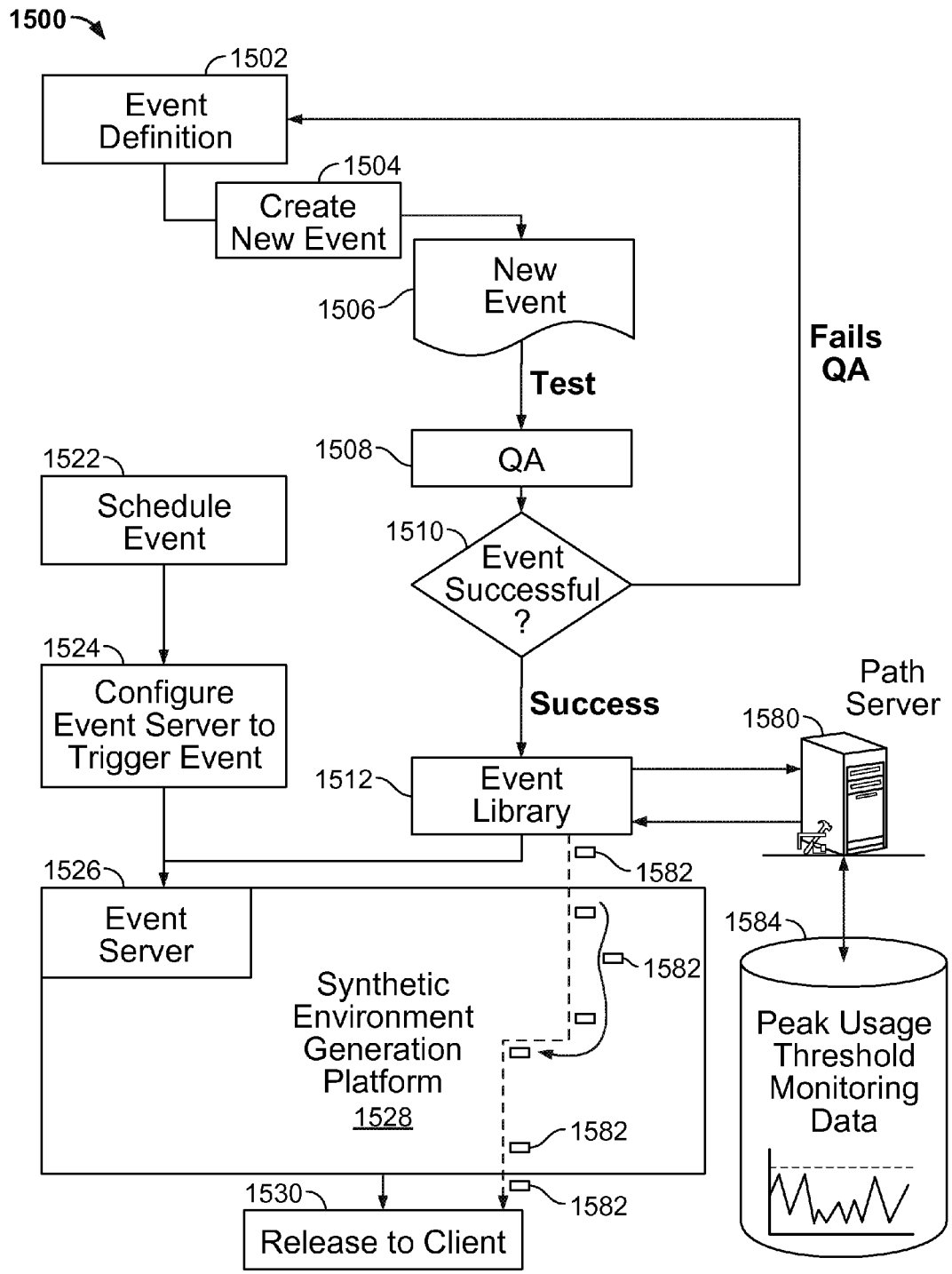
FIG. 15 depicts a flow for creating events for introducing various degrees of dynamic content, in accordance with at least one embodiment of the invention.

FIG. 15 depicts a flow for creating events for introducing various degrees of dynamic content, in accordance with at least one embodiment of the invention. Flow 1500 is an example of a method to create an event using plug objects, which include universal data structures stored in an event library. At 1502, an event is defined and requirements are indicated. At 1504, game designers create a new event by, for example, using pre-made plug objects, until the new event is established at 1506. At 1508, the event is tested to confirm that the new event meets quality assurance ("QA") specifications. If the event fails at 1510, then flow 1500 returns 1502 to redefine or correct the event definition and/or implementation. If the event is successful, then it is stored at 1512 in an event library. At 1522, the event is scheduled for introduction into a synthetic environment. At 1524, the event server 1526 is configured to trigger event at a predetermined time. At the scheduled time, event server 1526 fetches the data related to the event from event library 1512 and causes synthetic environment generation platform 1528 to implement the event (e.g., by generating dynamic content). Then, the dynamic content is released to client at 1530 for use in the computer-generated world.

In one embodiment, flow 1500 provides for the introduction of dynamic content into synthetic environments by way of a patch server process, as implemented in patch server 1580. In this example, patch server 1580 is configured to detect when data representing an event is deposited into the event library at 1512. Further, patch server 1580 is configured to push, or "trickle down," data required by the event down to the client as small files or pieces of data 1582. Accordingly, patch server 1580 can push data down at off-peak usage times and can avoid exceeding allotted bandwidth capacities that can otherwise occur when large downloads, such as 250 MB, happen during peak usage periods, which is costly. In another embodiment, patch server 1580 determines the amount of data to be pushed and the remaining time to the event, and, therefore calculates an average amount data that needs to be pushed per unit time. As such, patch server 1580 can vary the amounts of data in the small files 1582 for optimal transport. In a specific embodiment, patch server 1580 can be configured to access peak threshold monitoring data in database 1584 to determine when to vary the sizes of small files 1582 so as to avoid large amounts of data being pushed at peak usage times.

Figure 16:
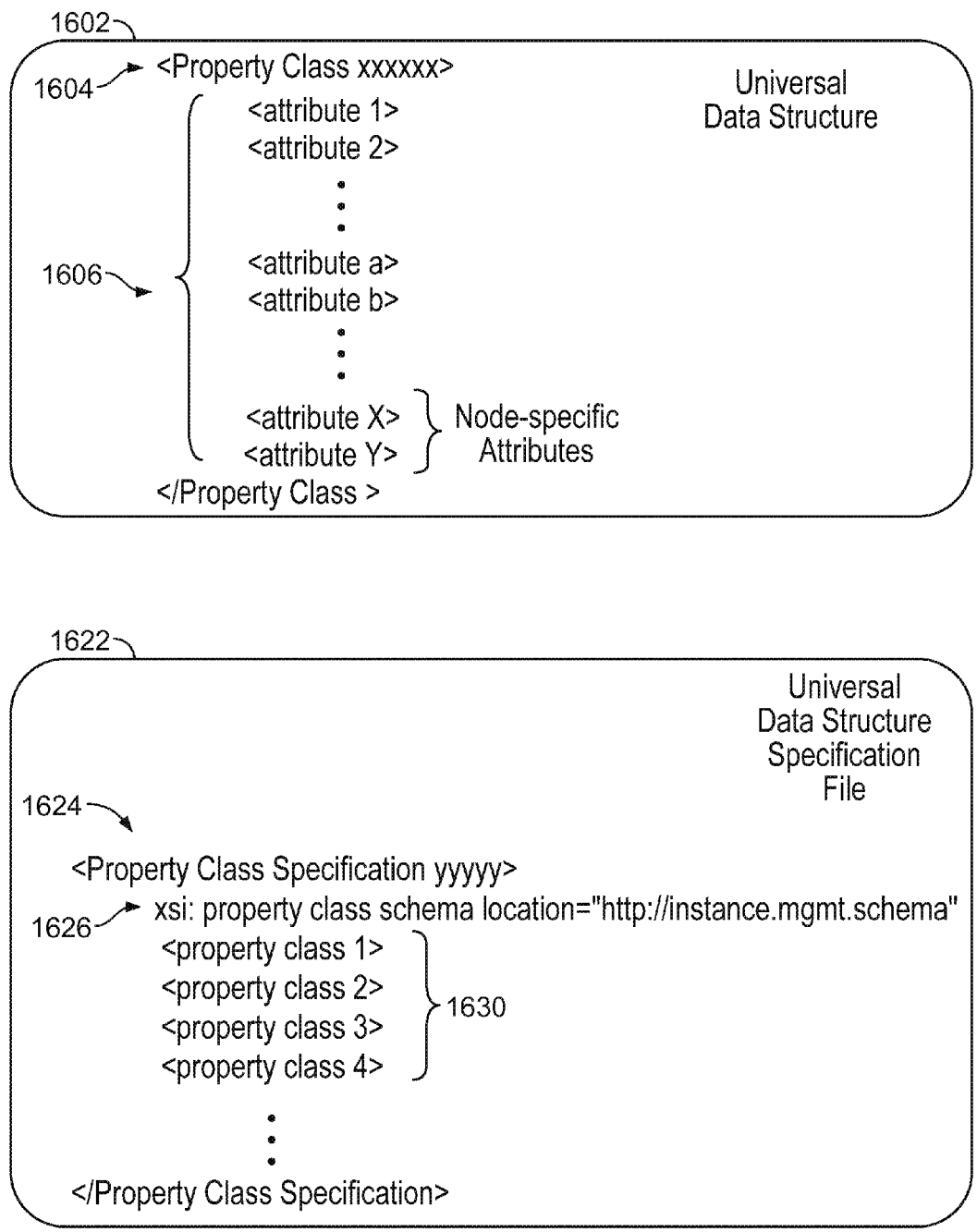
FIG. 16 is a diagram showing a specific implementation of a universal data structure in accordance with at least one embodiment of the invention.

FIG. 16 is a diagram showing a specific implementation of a universal data structure in accordance with at least one embodiment of the invention. Universal data structure 1602 is shown as a property class object identified by identifier 1604 (i.e., "Property Class xxxxxx"). The property class object includes an arrangement of data that includes attributes 1606, each of which can correspond to a property of Property Class xxxxxx, such as described below in relation to a universal data structure specification file 1622 of FIG. 16. Further, an attribute 1606 can correspond to a property value (e.g., string, integer, etc.), such as described in relation to universal data structure 1702 of FIG. 17. In various embodiments, universal data structure 1602 can include nested universal data structures (or references thereto). To illustrate, consider that Property Class xxxxxx can define the properties of a ship, such as described in FIG. 20. Universal data structure 1602 then can include a nested universal data structure that defines the properties of "positioning" that the ship possesses.

FIG. 16 also includes a diagram showing an example of a universal data structure specification file in accordance with at least one embodiment of the invention. Universal data structure specification file 1622 provides for an instance management schema, which uses nodes in a synthetic environment generation platform to access data embodied in a universal data structure. Universal data structure specification file 1622 may include metadata for each property class object, which may be configured to provide corresponding property values for assigned attributes. In some embodiments, a property class object or PropertyClass object (hereafter "property class object") may be an object having data or information that is used to determine how to render, generate, or instantiate various types of objects, information, and other parameters within a synthetic environment. Further, property class objects may be configured to provide reduced message data that, when used with, for example, high-speed or large capacity network connections, enable rapid or fast game play, synthetic environment generation, and the like. For example, a property class object may include all or a portion of data that is used to instantiate an object. A synthetic environment generation platform (or nodes therein) may implement the metadata for creating, displaying and/or implementing values of game data. Further, universal data structure specification file 1622 may be referenced by identifier 1624 (i.e., "Property Class Specification yyyyy"), and can include a reference 1626 to an instance management schema at, for example, location "instance.mgmt.schema." In some embodiments, the instance management schema is a data model describing the use of a node to access data in property class objects. Further, universal data structure specification file 1622 can include the property values (or references thereto) for property class objects 1630.

Figure 17:
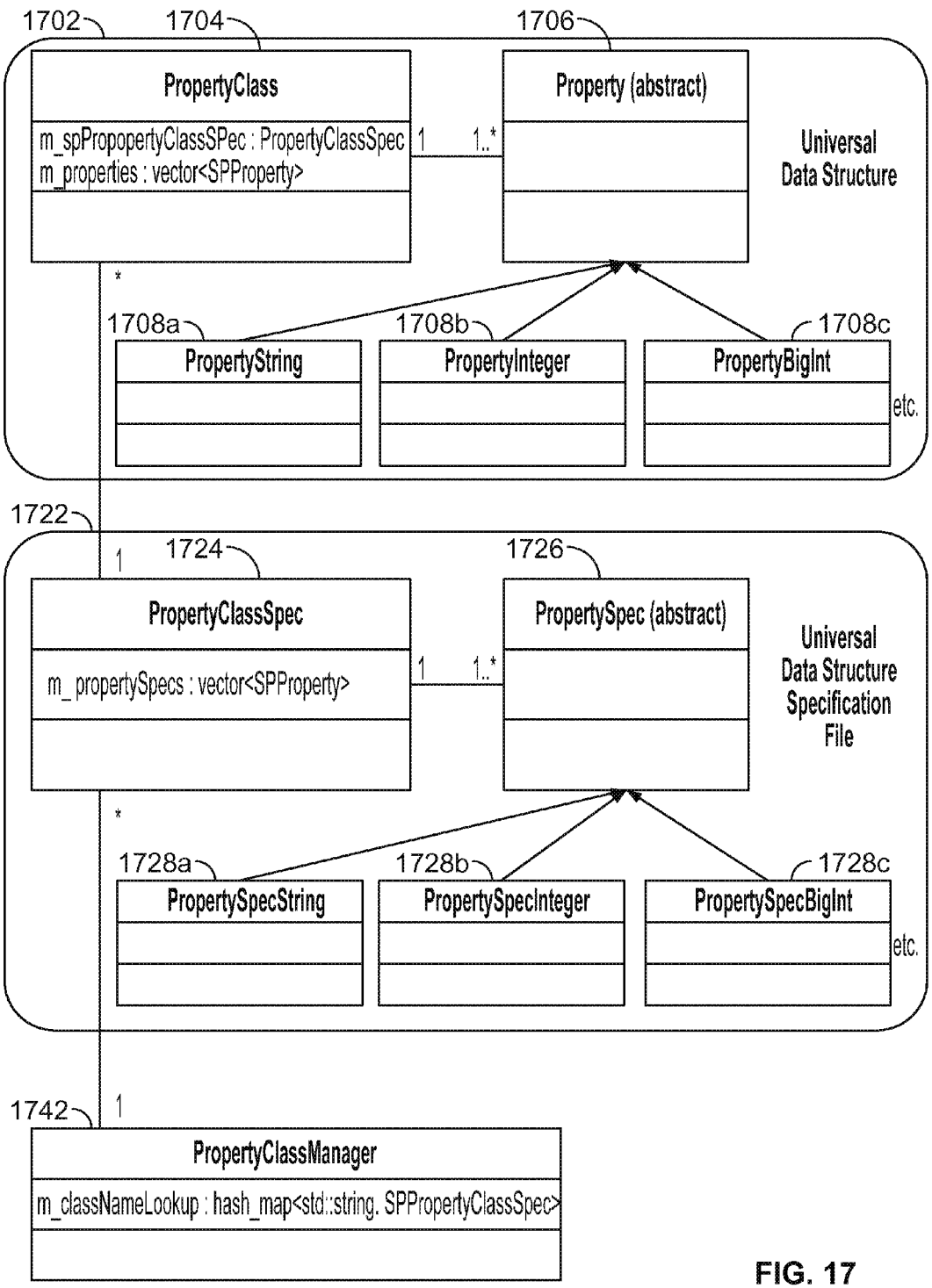
FIG. 17 is a diagram depicting elements of a property class system, according to at least one embodiment of the invention.

FIG. 17 is a diagram depicting elements of a property class system, according to at least one embodiment of the invention. In some embodiments, property class 1704 may be implemented as universal data structure 1702, and can have one or more properties ("Property") 1706. Here, property class 1704 is configured to be a container of specific property pointers to corresponding properties values. Further, the one or more properties 1706 can include property values, such as a string ("PropertyString") 1708a, an integer ("PropertyInt") 1708b, a large integer ("PropertyBigInt") 1708c, and others.

Universal data structure specification file 1722 is shown as including a property class specification 1724. As such, instances of a common type of property class 1704 may relate to a property class specification 1724. For example, property class 1704 named "Player" may have, for example, a relationship to property class specification 1724, which specifies properties and property values. Further, property class specification 1724 can include a vector of pointers to one or more property specifications ("PropertySpec") 1726, each of which may contain metadata associated with properties 1706. A property class manager ("PropertyClassManager") 1742 can include a map (e.g., a look-up table) for determining a property class name and a property class specification as a key and value pair. During run-time or execution, a synthetic environment generation platform (or nodes therein) can use property class manager 1742 to manage the implementation of data structures and the game data from the property class system.

Figure 18:
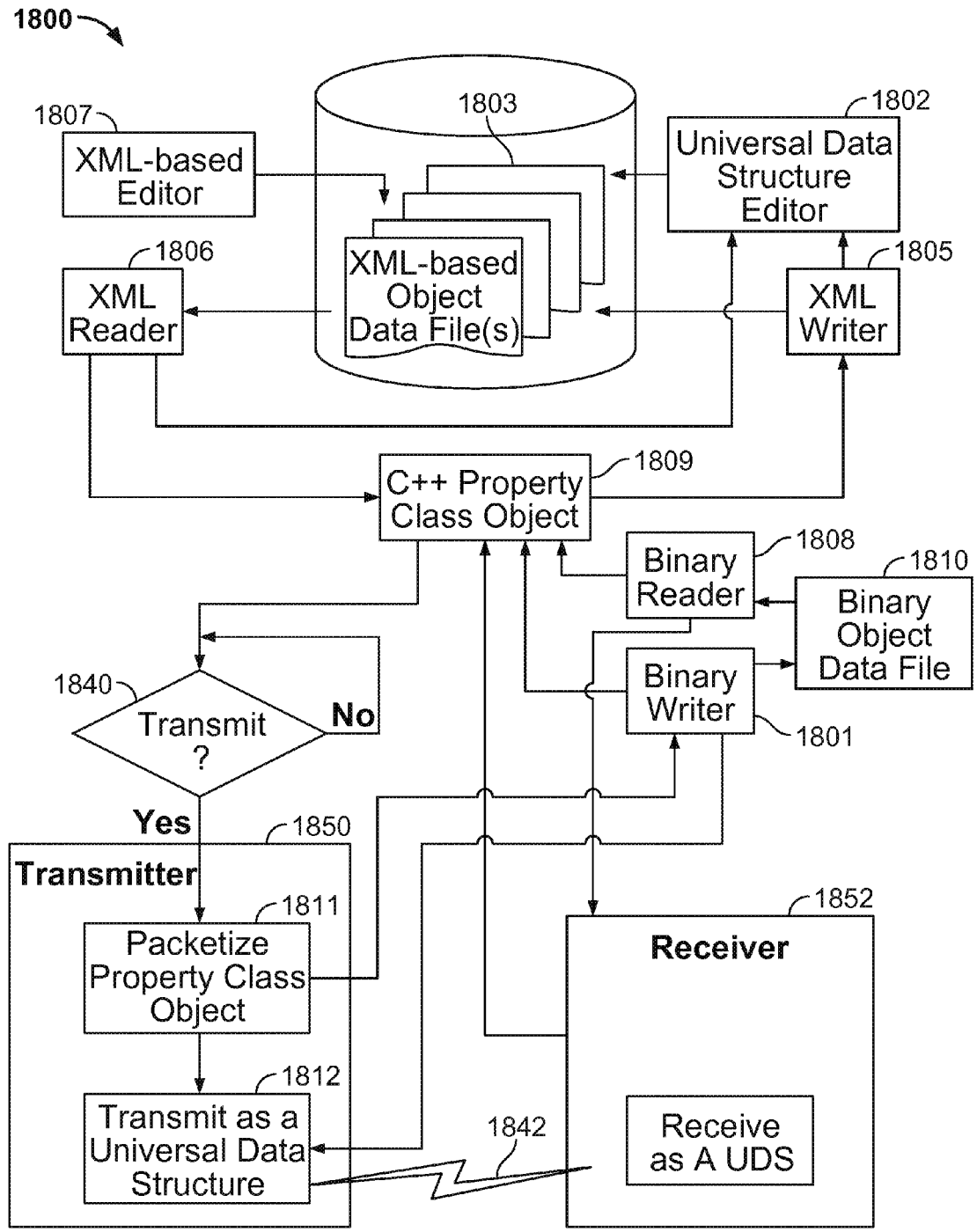
FIG. 18 depicts a flow for creating a universal message in accordance with at least one embodiment of the invention.

FIG. 18 depicts a flow for creating a universal message in accordance with at least one embodiment of the invention. Flow 1800 shows a universal data structure editor 1802 being configured to edit or create one or more property class object files, such as XML-based object data files 1803. Universal data structure editor 1802 can be, for example, an editor that provides context-friendly interface elements, such as drop down menus and data range validation based on the associated property class specs. Further, universal data structure editor 1802 uses the XML Reader 1806 and XML Writer 1805 to serialize the data to and from the source, which can be one or more of XML-based object data files 1803. In various embodiments, universal data structure editor 1802 can be configured to edit data formatted in accordance with extensible markup language (i.e., XML), hypertext markup language (i.e., HTML), and any other markup or formatting languages. Universal data structure editor 1802, in some instances, may be replaced with XML-based editor 1807 because the property class representation is in an XML-compliant format. XML-based editor 1807 may be any one of a number of commercially available tools, such as XMLSpy produced by Altova, Inc. of Beverly, Mass.

A property class data file 1803 is brought into the runtime environment using the serialization or XML Reader 1806 facility of the property system. This takes the XML-based property class data from a file 1803 and creates an "in-memory" C++ property class object representation 1809. Any modifications may be reflected back to the original source using the XML Writer 1805 facility.

To facilitate speed of serialization and obfuscation of data versus an XML representation, the property class object 1809 can be serialized to a disk-based binary format 1810 using the Binary Reader 1808 and Binary Writer 1801 mechanisms. This enables developers to edit in a human-readable format (i.e., XML) using convenient tools, and convert the XML into a binary format, when speed of execution and obfuscation are important.

Should any instance of a C++ object 1809 need to be transmitted over a network, the property class object is "packed" or "packetized" for transport in transmitter 1850. The packetize process at 1811 will use the services of the Binary Writer 1801 to create the packet and will transmit the packet at 1812 via link 1842. While receiver 1852 receives the packet and will use the services of the Binary Reader 1801 to unpack the data into an instance of the in memory C++ property class object representation 1809. Note that either transmitter 1850 or receiver 1852, or both, can be implement in universal message interfaces, according to various embodiments of the invention.

Figure 19:
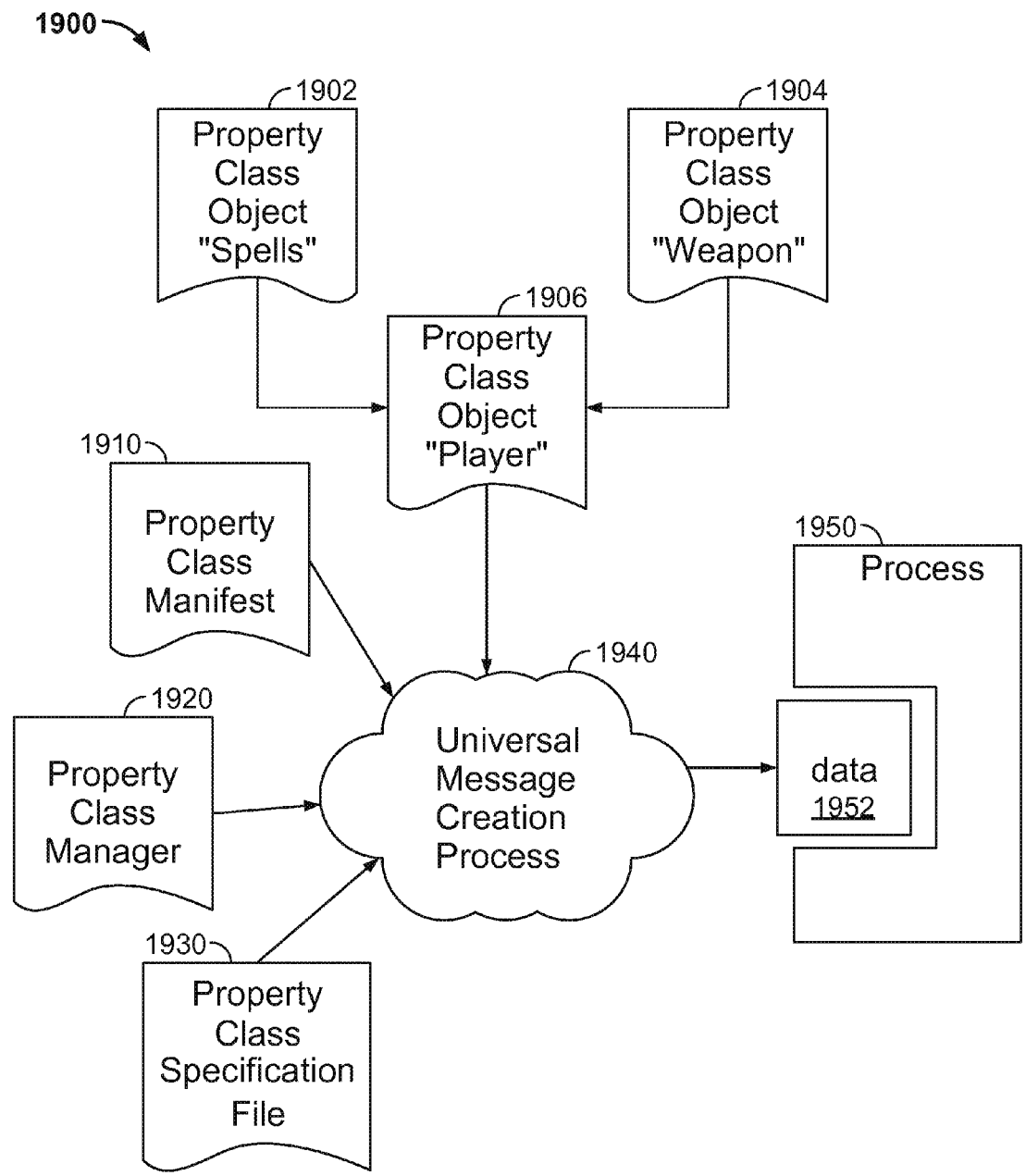
FIG. 19 illustrates elements of a property class system for creating a universal message in accordance with at least one embodiment of the invention.

FIG. 19 illustrates elements of a property class system for creating a universal message in accordance with at least one embodiment of the invention. Diagram 1900 depicts a universal message creation process 1940 that uses the following property class system elements: property class objects, such as property class objects 1902, 1904, and 1906, a property class manifest 1910, a property class manager 1920, and a property class specification file 1930. For illustration purposes, consider that universal message creation process 1940 is configured to generate a universal message regarding character data. As such, universal message creation process 1940 uses property class object ("player") 1906, which includes nested property class objects 1902 and 1904. Nested property class object ("spells") 1902 includes a data arrangement of data representing, for example, the types and strengths of spells that a player possesses. Nested property class object ("weapon") 1904 includes a data arrangement of data representing, for example, the kinds of weapons that the player possesses.

In at least one embodiment, property class manifest 1910 is configured to provide a space for listing or assembling information and data that may be used by a property system to instantiate property class objects. For example, property class manifest 1910 may include a list of property class identifiers ("IDs"), specification file (e.g., specification file 1722 (FIG. 17)) names, category tags for each listing to help group property class objects, and others. Further, property class manifest 1910 can describe file names, property class object names, and other resources (or sources of information) for creating a universal message. Property class manager 1920 can include a map of logical and physical resources and data to manage the implementation of data structures of property class objects 1902, 1904, and 1906 and the game data therein. Property class specification file 1930 can include property values or references to property values.

A synthetic environment generation platform and/or its nodes can implement universal message creation process 1940 and the above-described property class system elements to form a universal message (or a universal data structure), which can be used by the nodes of a synthetic environment generation platform, such as that shown in FIGS. 1 and 3, among others. When a node (e.g., a server, client, peer, or other processor) initiates a universal message creation process 1940, a universal data structure may be implemented as part of the universal message. Consider next that process 1950 receives implemented universal message. As such, process 1950 can use data 1952 directly from the message without requiring compilation of its source code.

Figure 20:
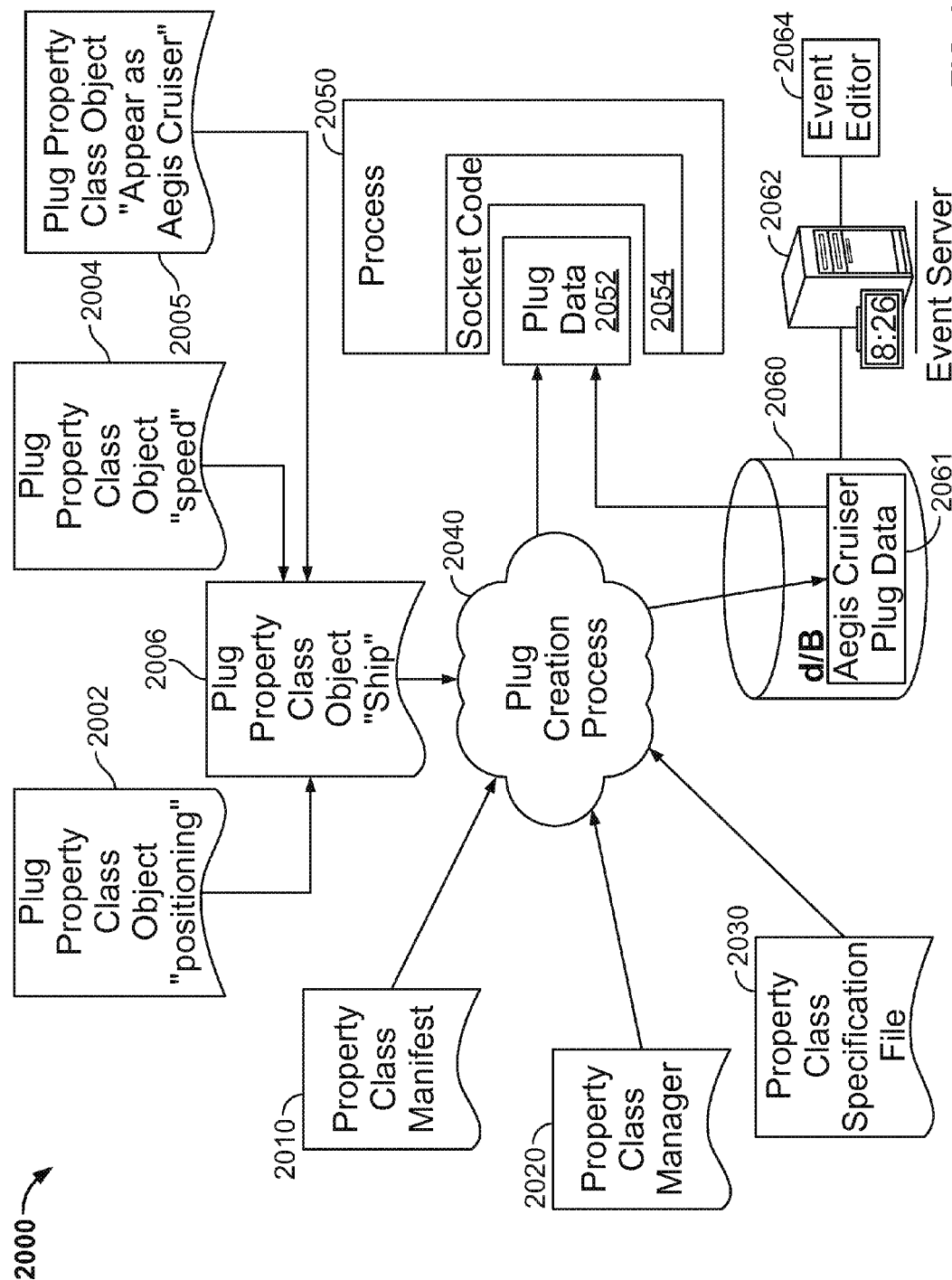
FIG. 20 illustrates elements of a property class system for creating a plug, according to at least one embodiment of the invention.

FIG. 20 illustrates elements of a property class system for creating a plug, according to at least one embodiment of the invention. Diagram 2000 depicts a plug creation process 2040 that uses the following property class system elements: property class objects 2002-2006, a property class manifest 2010, a property class manager 2020, and a property class specification file 2030. For illustration purposes, consider that plug creation process 2040 is configured to generate a plug for rendering the image or game element of a ship (e.g., freighter, tanker, warship (e.g., a Ticonderoga-class, Aegis guided missile cruiser), cruise liner, ocean liner, and others) as dynamic content into a synthetic environment. As such, plug creation process 2040 uses a plug property class object ("ship") 2006, which includes nested plug property class objects 2002, 2004 and 2005. Nested property class object ("positioning") 2002 includes a data arrangement of data representing, for example, the positioning and relative motion that the ship will possess. Nested property class object ("speed") 2004 includes a data arrangement of data representing, for example, the speed at which the ship steams (i.e., moves). Nested property class object ("appear as ship") 2005 includes a data arrangement of data that describes, for example, the appearance of a ship that looks like a desired ship shape. In at least one embodiment, property class manifest 2010, property class manager 2020, and property class specification file 2030 can have similar functions and/or structures as described in FIG. 19. In some embodiments, a plug can refer to representations that specify, for example, data, assets, procedural action list and conditional triggers, among other things. An example of a data representation is property class object 2004, which includes data specifying the speed of a ship. An example of an asset representation is plug property class object 2006, which includes data specifying a ship as an asset. An example of a representation for a procedural action list includes data that specifies actions that the plug object should perform. For example, procedural action list data can specify that a ship will: (1.) turn toward a harbor, (2.) keep sailing, and (3.) stop at a dock. An example of a conditional trigger representation includes data specifying that X should happen once the conditional trigger fires at event Y. For example, conditional trigger data can specify that the ship should blow up once it arrives at the dock.

A synthetic environment generation platform and/or its nodes can implement plug creation process 2040 and the above-described property class system elements to form plug data 2052. Consider next that process 2050 is the recipient of plug data 2052. In particular, plug data 2052 includes one or more universal data structures that can provide game data to socket code 2054 of process 2050. As such, process 2050 can use plug data 2052 to introduce dynamic content into a synthetic environment without requiring further or additional compilation of the source code for either process 2050 or socket code 2054. In one embodiment, plug data 2052 can be stored as ship plug data 2061 in a database ("d/B") 2060. A user can use event editor 2064 to collaborate with an event server 2062 to create ship plug data 2061. Further, the user can use event editor 2064 to schedule the date and time at which ship plug data 2061 is plugged into socket code 2054 for generating dynamic content, for example, at a scheduled time. In some embodiments, event editor 2064 can be an application built on top of either an XML editor or a property class editor.

Figure 21:
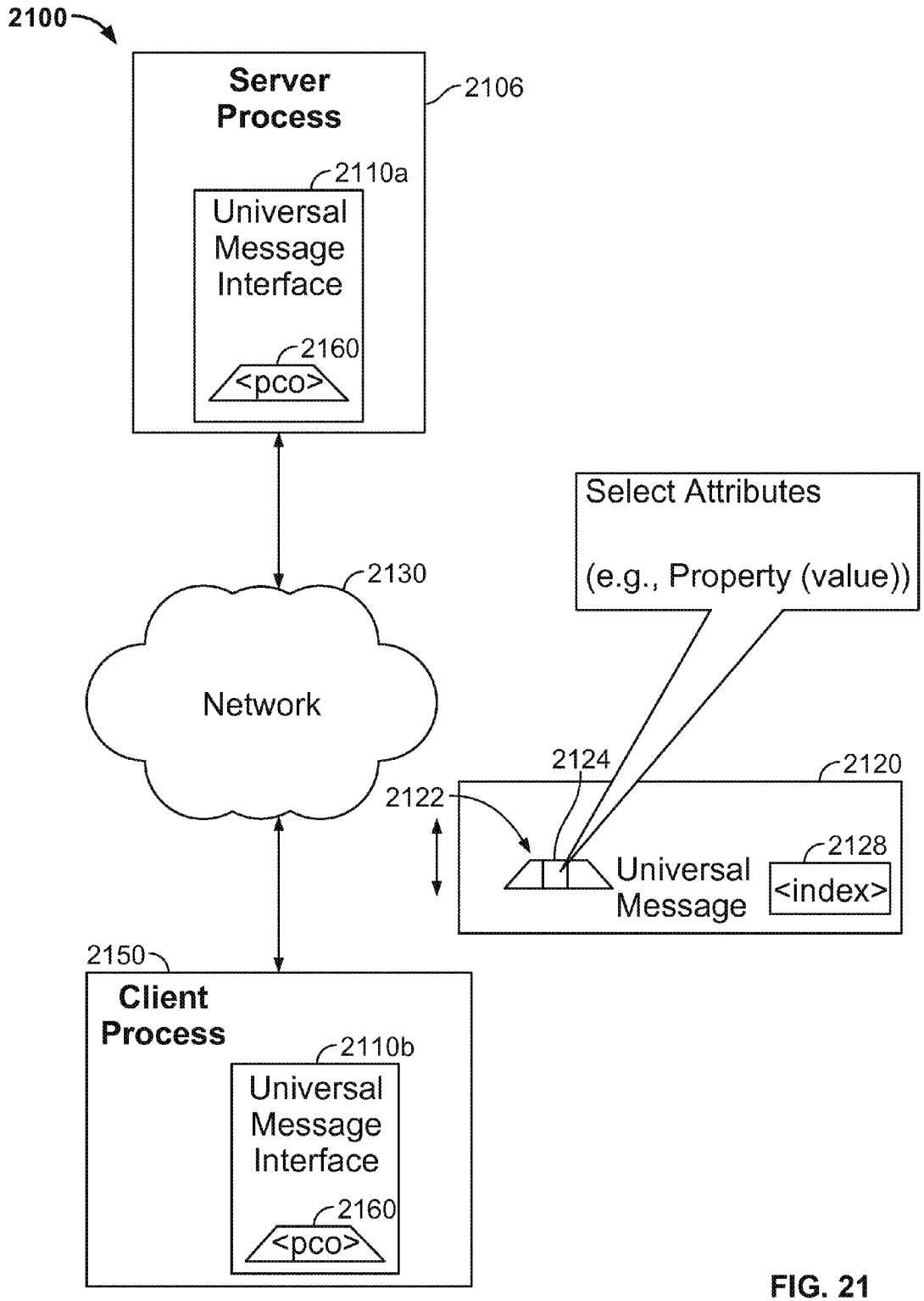
FIG. 21 is a diagram showing an example of a portion of a messaging system implementing a compressed universal message, according to at least one embodiment of the invention.

FIG. 21 is a diagram showing a portion of a messaging system implementing a compressed universal message, according to at least one embodiment of the invention. Here, message system portion 2100 includes a server process 2106 and a client process 2150, both of which are coupled via a network 2130 for exchanging messages, among other things. In this embodiment, message system portion 2100 can transport a message as a universal data structure, including a subset of data associated with a server-side (or a client-side) property class object ("<pco>") 2160. An example of such a message is a response from client process 2150 indicating a modification to the synthetic environment. Server process 2106 and client process 2150 respectively include universal message interface 2110a and universal message interface 2110b. Server process 2106 can use data arranged in accordance with property class object 2160 to, in whole or in part, generate a synthetic environment in response to game data modifications transmitted from client process 2150. An example of modified game data is the data generated by client process 2150 to cause movement for an avatar in the synthetic environment. In at least one embodiment, server process 2106 and/or client process 2150 can exchange messages as a compressed universal message 2120. As both server process 2106 and client process 2150 can implement property class object 2160 with which to exchange data, a reduced amount of data may be exchanged in compressed universal message 2120. In some embodiments, modified game data 2124 associated with property class object 2122 may be transported in a universal message. As an example, consider that modified game data 2124 specifies a modified value for a certain property, which may be identified by an index. As such, compressed universal message 2120 may include index 2128 to identify a related attribute of modified game data 2124. With this information, server process 2106 may be configured or implemented to modify the synthetic environment.

Figure 22:
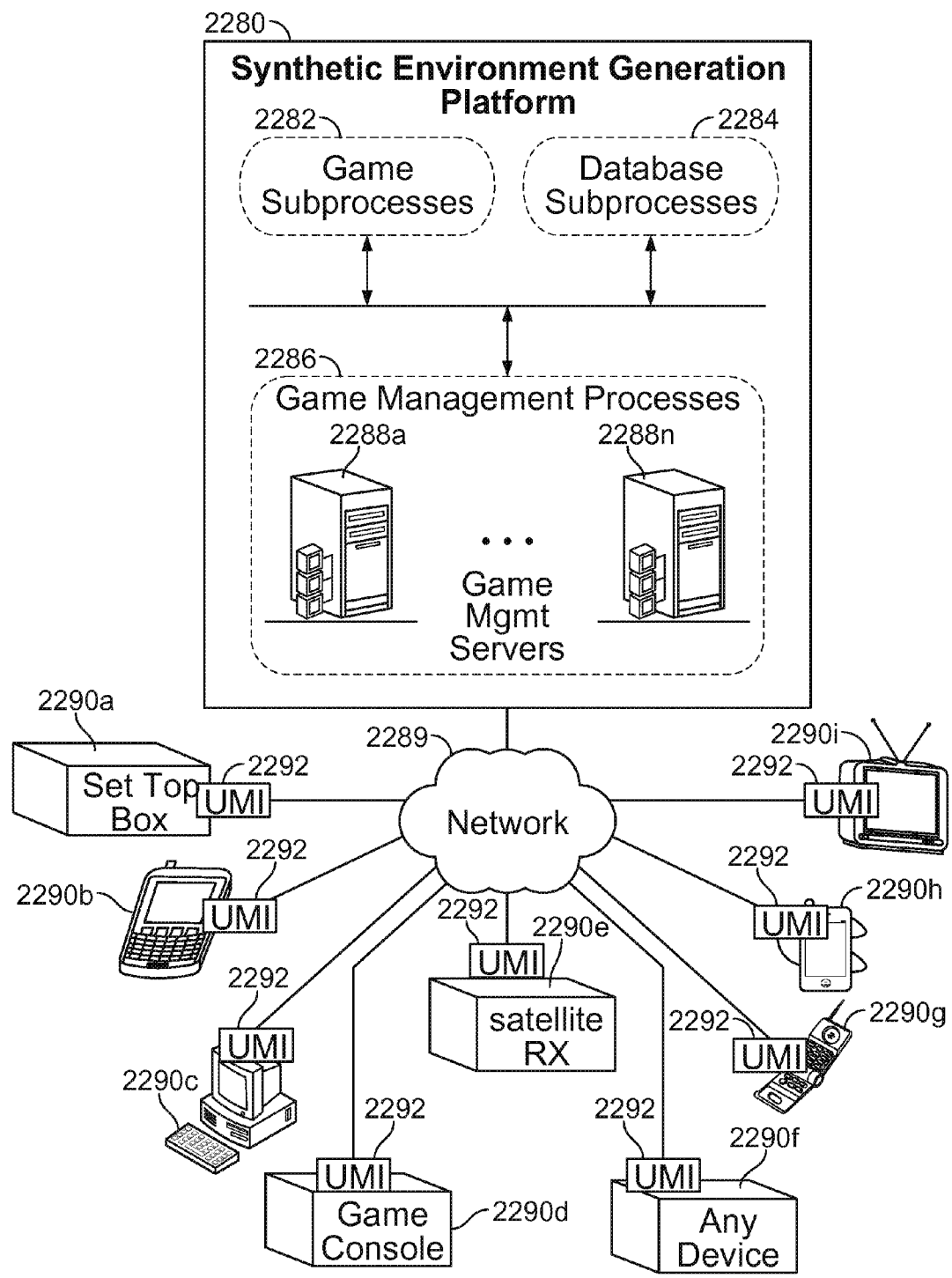
FIG. 22 is an illustration of a number of clients implementing a universal messaging interface to interact with a synthetic environment generation platform, according to at least one embodiment of the invention.

FIG. 22 is an illustration of multiple devices implementing a universal messaging interface to interact with a synthetic environment generation platform, according to at least one embodiment of the invention. Synthetic environment generation platform 2800 includes game subprocesses 2282, database processes 2284, and game management processes 2286, which include game management servers 2288a to 2288n. As is shown, a variety of clients 2290 implementing a universal messaging interface ("UMI") 2292 can interact with synthetic environment generation platform 2200 via a network 2289, such as the Internet In this example, set top box 2290a, mobile device 2290b, computing device 2290c, game console 2290d, satellite receiver ("RX") 2290e, cell phone 2290g, personal digital assistant ("PDA") 2290h, and television 2290i, among other things, can be configured to implement a universal messaging interface ("UMI") 2292 as is described herein. In at least one embodiment, any device 2290f that includes logic (e.g., a processor and memory) can implement universal data structures and/or property classes of the various embodiments to participant in a synthetic environment.

In various embodiments, the property class systems and instances thereof can be implemented as C++ property class objects, or any other property class in other programming languages. Further, while the above-discussion describes various features in the context of on-line gaming, the embodiments of the invention are not to be limited to on-line gaming. Rather, the features and techniques described herein can be applied to synthetic environment for training purposes, educational purposes, social purposes, and the like. Note, too, that while the above-discussion is in the context of distributed servers in a client-server architecture, the various embodiments are not so limiting. For example, one or more node processes can be aggregated into a single process. Further, any network architecture and topology can be implemented with the embodiments of the invention. For example, a synthetic environment generation platform can implement peer-to-peer network and the like.

In at least some of the embodiments of the invention, the structures and/or functions of any of the above-described features can be implemented in software, hardware, firmware, circuitry, or a combination thereof. Note that the structures and constituent elements above, as well as their functionality, can be aggregated with one or more other structures or elements. Alternatively, the elements and their functionality can be subdivided into constituent sub-elements, if any. As software, the above-described described techniques can be implemented using various types of programming or formatting languages, frameworks, syntax, applications, protocols, objects, or techniques, including C, Objective C, C++, C#, Flex™, Fireworks®, Java™, Javascript™, AJAX, COBOL, Fortran, ADA, XML, HTML, DHTML, XHTML, HTTP, XMPP, and others. These can be varied and are not limited to the examples or descriptions provided.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment can readily be interchanged with other embodiments.

Thus, the foregoing descriptions of specific embodiments of the invention are presented for purposes of illustration and description. They are not intended to be exhaustive or to limit the invention to the precise forms disclosed; many alternatives, modifications, equivalents, and variations are possible in view of the above teachings. For the purpose of clarity, technical material that is known in the technical fields related to the embodiments has not been described in detail to avoid unnecessarily obscuring the description. Thus, the various embodiments can be modified within the scope and equivalents of the appended claims. Further, the embodiments were chosen and described in order to best explain the principles of the invention and its practical applications; they thereby enable others skilled in the art to best utilize the invention and various embodiments with various modifications as are suited to the particular use contemplated. Notably, not every benefit described herein need be realized by each embodiment of the present invention; rather any specific embodiment can provide one or more of the advantages discussed above. In the claims, elements and/or operations do not imply any particular order of operation, unless explicitly stated in the claims. It is intended that the following claims and their equivalents define the scope of the invention.

The invention claimed is:

1. A method to introduce content into synthetic environments, the method comprising:
   maintaining data representing an event in an event library database, the event associated with a plug object configured to interact with object code executing to create a synthetic environment, wherein the synthetic environment is a computer-based simulated environment of a virtual world;
   detecting a condition that triggers introduction of dynamic content into the synthetic environment;
   introducing the dynamic content into the synthetic environment during the execution of the object code, wherein the introducing of the dynamic content into the synthetic environment comprises:
      determining an off-peak usage time and a peak usage time, the off-peak usage time having a lower cost for transmitting data than the peak usage time; and
      scheduling and transmitting the dynamic content to a client during the off-peak time; and
   in the event that different dynamic content is introduced into the synthetic environment, generating a portion of the synthetic environment without revising the object code.

2. The method of claim 1 further comprising:
   determining a time during which the dynamic content persists in association with at least a portion of the synthetic environment.

3. The method of claim 1 further comprising:
   generating data configured to display a representation of the time during which the dynamic content is introduced into the synthetic environment.

4. The method of claim 3 further comprising:
   storing data representing another event in the event library database;
   scheduling another plug object of the another event to interact with the object code; and
   generating additional data configured to display a representation of another time during which additional dynamic content is introduced into the synthetic environment.

5. The method of claim 4 further comprises:
   displaying the representation of the another time in association with an event server guide.

6. The method of claim 1 further comprising:
   generating the event to include the plug object without modifying the object code.

7. The method of claim 1 further comprising:
   developing source code with the plug object; and
   compiling the source code to form the object code.

8. The method of claim 7 further comprising:
   developing another plug object in association with another event;
   testing the another plug object in association with the object code; and
   determining whether the another plug object meets one or more quality assurance ("QA") specifications.

9. The method of claim 8 further comprising:
   storing plug data associated with the another plug object in the event library database if the one or more quality assurance specifications are met.

10. The method of claim 1 further comprising:
    initializing a plug insertion process by which the plug object interacts with the object code.

11. The method of claim 10 further comprising:
    fetching plug data of the plug object from the event library database; and
    incorporating the plug data with socket code of the object code.

12. The method of claim 1, wherein the dynamic content includes data representing location of an object, positioning of the object, speed of the object, path of the object, or any combination thereof.

13. The method of claim 1, wherein the introducing of the dynamic content into the synthetic environment further comprises dividing the dynamic content into a plurality of pieces of data.

14. A method to introduce content into synthetic environments, the method comprising:
    executing object code to generate a synthetic environment, wherein the synthetic environment is a computer-based simulated environment of a virtual world;
    monitoring times at which data from property class objects are to be inserted into socket code of the object code;
    detecting a scheduled time for one of the property class objects;
    inserting the data into the socket code to associate content with the synthetic environment, wherein the inserting of the data into the socket code comprises:
       determining whether an event has occurred, the event including a scheduled time or a condition, the condition including a number of participants at a location has surpassed a threshold; and
       in the event that the event has occurred, inserting the data into the socket code; and
    in the event that different data is inserted into the socket code, generating a portion of the synthetic environment without revising the object code.

15. The method of claim 14 further comprising:
    accessing one or more data arrangements that comport with the property class objects to fetch the data.

16. The method of claim 15 further comprising:
    determining an asset representation for an item that is associated with the data; and
    rendering the item in relation to the synthetic environment.

17. The method of claim 15 further comprising:
    determining a procedural action list for an item that is associated with the data; and
    implementing actions for the item as a function of the procedural action list in the context of the synthetic environment.

18. The method of claim 14 wherein inserting the data into the socket code comprises:
    generating a universal message including at least a portion of the data; and
    transmitting the universal message from an event server to a game management server.

19. The method of claim 18 wherein transmitting the universal message comprises:
    transmitting the universal message as an XML-formatted message.

20. The method of claim 18 wherein transmitting the universal message comprises:
   transmitting the universal message as a binary-formatted message.

21. A system for introducing content into synthetic environments, comprising:
   a processor configured to:
      maintain data representing an event in an event library database, the event associated with a plug object configured to interact with object code executing to create a synthetic environment, wherein the synthetic environment is a computer-based simulated environment of a virtual world;
      detect a condition that triggers introduction of dynamic content into the synthetic environment;
      introduce the dynamic content into the synthetic environment during the execution of the object code, wherein the introducing of the dynamic content into the synthetic environment comprises:
         determine an off-peak usage time and a peak usage time, the off-peak usage time having a lower cost for transmitting data than the peak usage time; and
         schedule and transmit the dynamic content to a client during the off-peak time; and
      in the event that different dynamic content is introduced into the synthetic environment, generate a portion of the synthetic environment without revising the object code; and
   a memory coupled to the processor and configured to provide the processor with instructions.

22. A computer program product for introducing content into synthetic environments, the computer program product being embodied in a non-transitory computer readable storage medium and comprising computer instructions for:
   maintaining data representing an event in an event library database, the event associated with a plug object configured to interact with object code executing to create a synthetic environment, wherein the synthetic environment is a computer-based simulated environment of a virtual world;
   detecting a condition that triggers introduction of dynamic content into the synthetic environment;
   introducing the dynamic content into the synthetic environment during the execution of the object code, wherein the introducing of the dynamic content into the synthetic environment comprises:
      determining an off-peak usage time and a peak usage time, the off-peak usage time having a lower cost for transmitting data than the peak usage time; and
      scheduling and transmitting the dynamic content to a client during the off-peak time; and
   in the event that different dynamic content is introduced into the synthetic environment, generating a portion of the synthetic environment without revising the object code.

* * * * *